US007722460B2

(12) United States Patent
Walker et al.

(10) Patent No.: US 7,722,460 B2
(45) Date of Patent: May 25, 2010

(54) METHOD AND APPARATUS FOR AUTOMATICALLY OPERATING A GAME MACHINE

(75) Inventors: Jay S. Walker, Ridgefield, CT (US); James A. Jorasch, Stamford, CT (US); Russell P. Sammon, San Francisco, CA (US); Geoffrey M. Gelman, Stamford, CT (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/428,601

(22) Filed: Jul. 5, 2006

(65) Prior Publication Data

US 2006/0252510 A1 Nov. 9, 2006

Related U.S. Application Data

(63) Continuation of application No. 10/331,438, filed on Dec. 27, 2002, now abandoned, which is a continuation-in-part of application No. 09/879,299, filed on Jun. 12, 2001, now Pat. No. 6,634,942, which is a continuation-in-part of application No. 09/437,204, filed on Nov. 9, 1999, now Pat. No. 6,244,957, which is a continuation of application No. 08/774,487, filed on Dec. 30, 1996, now Pat. No. 6,012,983.

(60) Provisional application No. 60/373,750, filed on Apr. 18, 2002.

(51) Int. Cl.
*A63F 13/00* (2006.01)

(52) U.S. Cl. ........................................................ 463/25

(58) Field of Classification Search ................ 463/1-69
See application file for complete search history.

(56) References Cited

U.S. PATENT DOCUMENTS

| | | | | |
|---|---|---|---|---|
| 4,467,424 | A | 8/1984 | Hedges et al. | 364/412 |
| 4,636,951 | A | 1/1987 | Harlick | 364/412 |
| 4,764,666 | A | 8/1988 | Bergeron | 235/380 |

(Continued)

FOREIGN PATENT DOCUMENTS

| | | |
|---|---|---|
| CA | 2 297 230 | 7/2001 |

(Continued)

OTHER PUBLICATIONS

Brochure, "Flying Bet Roulette" DEQ Casinos Ltd., undated.

(Continued)

*Primary Examiner*—Scott Jones
(74) *Attorney, Agent, or Firm*—K&L Gates LLP

(57) ABSTRACT

A gaming device such as a slot machine may be operated in an automated play mode in which the need for player input is reduced or eliminated. Game play cycles may be continuously performed in the automated play mode without player input. One or more parameters for controlling the automated play mode may be determined based on player input and/or data or a program stored in the gaming device and/or data or a program stored in a controller in communication with the gaming device. Termination of the automated play mode may result from player input and/or may be determined on the basis of a parameter that may be determined on the basis of player input or may be determined automatically by the gaming device or by a controller in communication with the gaming device.

38 Claims, 11 Drawing Sheets

U.S. PATENT DOCUMENTS

| | | | | | |
|---|---|---|---|---|---|
| 4,880,237 | A | | 11/1989 | Kishishita | 273/138 A |
| 5,401,024 | A | | 3/1995 | Simunek | 273/138 A |
| 5,429,361 | A | | 7/1995 | Raven et al. | 273/138 A |
| 5,551,692 | A | | 9/1996 | Pettit et al. | 273/143 R |
| 5,570,885 | A | | 11/1996 | Ornstein | 463/27 |
| 5,741,183 | A | | 4/1998 | Acres et al. | 463/42 |
| 5,743,800 | A | | 4/1998 | Huard et al. | |
| 5,758,875 | A | | 6/1998 | Giacalone, Jr. | 273/143 R |
| 5,762,552 | A | | 6/1998 | Vuong et al. | |
| 5,770,533 | A | | 6/1998 | Franchi | 463/42 |
| 5,772,509 | A | | 6/1998 | Weiss | 463/16 |
| 5,800,268 | A | | 9/1998 | Molnick | 463/40 |
| 5,816,917 | A | | 10/1998 | Kelmer et al. | |
| 5,830,067 | A | * | 11/1998 | Graves et al. | 463/40 |
| 5,980,384 | A | | 11/1999 | Barrie | 463/16 |
| 6,001,016 | A | | 12/1999 | Walker et al. | |
| 6,012,983 | A | | 1/2000 | Walker et al. | |
| 6,024,643 | A | | 2/2000 | Begis | |
| 6,050,895 | A | | 4/2000 | Luciano, Jr. et al. | |
| 6,139,430 | A | | 10/2000 | Huard et al. | |
| 6,146,270 | A | | 11/2000 | Huard et al. | |
| 6,244,957 | B1 | | 6/2001 | Walker et al. | |
| 6,273,820 | B1 | | 8/2001 | Haste, III | |
| 6,299,533 | B1 | | 10/2001 | Parra et al. | 463/17 |
| 6,306,038 | B1 | | 10/2001 | Graves et al. | 463/40 |
| 6,318,721 | B1 | | 11/2001 | Randall et al. | |
| 6,709,331 | B2 | | 3/2004 | Berman | |
| 6,935,949 | B1 | | 8/2005 | Murphy | |
| 7,628,691 | B2 | | 12/2009 | Luciano, Jr. et al. | |
| 2002/0002073 | A1 | | 1/2002 | Montgomery et al. | |
| 2002/0125641 | A1 | | 9/2002 | Moody | |
| 2003/0162582 | A1 | | 8/2003 | Gordon | |

FOREIGN PATENT DOCUMENTS

| | | |
|---|---|---|
| DE | 44 11 090 | 10/1995 |
| WO | WO 01/65508 | 9/2001 |
| WO | WO 02/32528 | 4/2002 |

OTHER PUBLICATIONS

Busch, Melanie, "Tulsa Firm Explores Internet Gaming", Tulsa World, Aug. 1, 1996, Section: Business, p. E1.

"MGAM Signs Agreement With Lac Vieux Desert Chippewa Tribe", Business Wire, May 18, 2001.

"DEQ Casino—Flying Bet Roulette", (http //www deq com/ang/flying html), download date: Nov. 24, 2002.

Email: "We have added a new 'Auto-Spin' feature . . . ", slotmachine@searchout.com, sent: Sep. 17, 1999, (http //www searchout com).

"Affidavit Under 37 CFR 1.131", for U.S. Appl. No. 10/134,007, entitled "Continuous Play Slot Machine and Retrofit Kit", filed Jan. 4, 2005 in the name of Charles Murphy, 15 pp.

"GameCast Live—Home", (http //www gamecastlive com/), download date: Nov. 24, 2002.

"GameCast Live—About the Product", (http //www gamecastlive com/about_the product html), download date: Nov. 24, 2002.

"GameCast Live—PowerPoint Presentation", (http //www gamecastlive com/presentation/toronto2_files/frame htm), download date: Nov. 24, 2002.

"GameCast Live—Press Release", (http //www gamecastlive com/press_june_6 html), download date: Nov. 24, 2002.

"Welcome—i2corp.com", (http //www i2corp com/), download date: Nov. 24, 2002.

"Games—i2corp.com", (http //www i2corp com/games/index cfm), download date: Nov. 24, 2002.

"The Home Gambling Network—Welcome", (http //www homegamblingnetwork com), download date: Nov. 24, 2002.

"The Home Gambling Network—Players", (http //www homegamblingnetwork com/player php3), download date: Nov. 24, 2002.

"Multimedia Games, Inc.—Home", (http www betnet com/), download date: Nov. 24, 2002.

Ritchie, Lauren, "Orange Man Sought in Betting Probe" Orlando Sentinel Tribune, May 30, 1990, Section: Local & State, p. B2.

Mayo, Michael, "Win-Or-Lose Cruise; You Can Bet Sports Legally Around Here—Just Wait Till The Boat is 3 Miles Out.", Sun-Sentinel, Dec. 28, 1994, Section: Sports, p. 1C.

Cave, Kathy, "The Lake Effect", Milwaukee Journal Sentinel, Mar. 27, 1996, Section: News, p. 8.

Website: "Bingo—Network Gaming International", (http //network-bingo com/bingo htm), download date: Nov. 13, 1996.

"Super Double Jackpot" PC Software from SafeGaurd Information Services, Oct. 14, 2002.

* cited by examiner

408

| | SESSION IDENTIFIER 514 | GAME 516 | PLAYER IDENTIFIER 518 | CREDITS 520 | START TIME 522 | GAMES PLAYED 524 | AUTO-PLAY MODE ENABLED? 526 |
|---|---|---|---|---|---|---|---|
| 502 | SESN-912304813-01 | MEGA-JACKPOT SLOT MACHINE | PLAY-028345525-01 | 142 | 6:37 PM 4/1/02 | 437 | YES |
| 504 | SESN-912304813-02 | VOLCANO VIDEO POKER | PLAY-028345525-02 | 36 | 8:35 PM 4/1/02 | 14 | YES |
| 506 | SESN-912304813-03 | HOME RUN SLOT MACHINE | NOT SPECIFIED | 19 | 8:40 PM 4/1/02 | 13 | YES |
| 508 | SESN-912304813-04 | SILVER RING SLOT MACHINE | PLAY-028345525-04 | 86 | 7:26 PM 4/1/02 | 185 | YES |
| 510 | SESN-912304813-05 | POT OF GOLD SLOT MACHINE | PLAY-028345525-05 | 112 | 8:19 PM 4/1/02 | 56 | NO |
| 512 | SESN-912304813-06 | PIRATE TREASURE VIDEO BLACKJACK | NOT SPECIFIED | 6 | 7:33 PM 4/1/02 | 79 | YES |

FIG. 5

410

| | SESSION IDENTIFIER 614 | AUTO-PLAY STATUS 616 | BET SIZE 618 | SPEED OF PLAY 620 | EXIT EVENT(S) 622 |
|---|---|---|---|---|---|
| 602 | SESN-912304813-01 | IN PROGRESS | 2 COINS | FAST | TRIG-02854235-01, TRIG-02854235-03, TRIG-02854235-05 |
| 604 | SESN-912304813-02 | IN PROGRESS; LOCKED | 3 COINS | FASTER | TRIG-02854235-02 |
| 606 | SESN-912304813-03 | PAUSED | 3 COINS | SLOW | TRIG-02854235-04, TRIG-02854235-06 |
| 608 | SESN-912304813-04 | IN PROGRESS | 1 COIN | FASTEST | TRIG-02854235-01, TRIG-02854235-07, TRIG-02854235-09 |
| 610 | SESN-912304813-05 | N/A | N/A | N/A | N/A |
| 612 | SESN-912304813-06 | IN PROGRESS | 1 COIN | MEDIUM | NONE |

FIG. 6

412

| | EXIT EVENT IDENTIFIER 720 | EXIT EVENT 722 | MESSAGE TO DISPLAY 724 |
|---|---|---|---|
| 702 | TRIG-02854235-01 | NUMBER OF CREDITS IS LESS THAN 10 | "YOU HAVE LESS THAN 10 CREDITS LEFT! INSERT MORE COINS TO EXTEND YOUR GAME" |
| 704 | TRIG-02854235-02 | PLAYER JUST WON A JACKPOT | "CONGRATULATIONS! YOU JUST WON A JACKPOT! PRESS THE 'AUTO' BUTTON TO RESUME AUTO-PLAY MODE" |
| 706 | TRIG-02854235-03 | PLAYER HAS BEEN PLAYING CONTINUOUSLY FOR 3 HOURS | "WANT TO TAKE A BREAK? PRESS THE 'LOCK' BUTTON TO CONTINUE GAMBLING WHILE YOU'RE ON BREAK." |
| 708 | TRIG-02854235-04 | MACHINE IS JAMMED | "THE MACHINE IS JAMMED. AN ATTENDANT HAS BEEN CALLED AND WILL BE WITH YOU SHORTLY." |
| 710 | TRIG-02854235-05 | GAME HAS ENTERED A BONUS ROUND | "YOU JUST WON ACCESS TO THE BONUS ROUND! AUTO-PLAY IS DISABLED WHILE YOU ARE IN THE BONUS ROUND." |
| 712 | TRIG-02854235-06 | PLAYER PRESSES ANY BUTTON ON THE SLOT MACHINE | "AUTO-PLAY HAS BEEN PAUSED. WOULD YOU LIKE TO CONTINUE AUTO-PLAY MODE OR RETURN TO REGULAR MODE?" |
| 714 | TRIG-02854235-07 | PLAYER HAS WON THE LAST 3 GAMES | "IT LOOKS LIKE YOU'RE ON A WINNING STREAK! WOULD YOU LIKE TO SPEED UP AUTO-PLAY MODE? |
| 716 | TRIG-02854235-08 | NUMBER OF CREDITS IS GREATER THAN 1000 | "YOU HAVE MORE THAN 1000 CREDITS! WOULD YOU LIKE TO CONTINUE AUTO-PLAY MODE? |
| 718 | TRIG-02854235-09 | NUMBER OF CREDITS FALLS BELOW 30 AND BET SIZE IS MORE THAN 2 CREDITS | "AUTO-PLAY HAS BEEN PAUSED BECAUSE YOU HAVE LESS THAN 30 CREDITS LEFT. DO YOU WANT TO REDUCE YOUR BET SIZE?" |

FIG. 7

METHOD AND APPARATUS FOR AUTOMATICALLY OPERATING A GAME MACHINE

CROSS-REFERENCE TO RELATED APPLICATIONS

The present application is a continuation of U.S. patent application Ser. No. 10/331,438, filed Dec. 27, 2002 now abandoned, entitled "Method And Apparatus For Automatically Operating A Game Machine";

which is a continuation-in-part of U.S. patent application Ser. No. 09/879,299, filed Jun. 12, 2001 and issued as U.S. Pat. No. 6,634,942 on Oct. 21, 2003, entitled "System and Method for Automated Play of Multiple Gaming Device"; which is a continuation-in-part of U.S. patent application Ser. No. 09/437,204, entitled "Automated Play Gaming Device", filed Nov. 9, 1999, and issued as U.S. Pat. No. 6,244,957 on Jun. 12, 2001; which is a continuation of U.S. patent application Ser. No. 08/774,487, entitled "Automated Play Gaming Device", filed Dec. 30, 1996, and issued as U.S. Pat. No. 6,012,983 on Jan. 11, 2000.

The parent application Ser. No. 10/331,438 claims the benefit of priority of U.S. Provisional Patent Application No. 60/373,750, filed Apr. 18 2002.

Each of the above-referenced applications is incorporated by reference herein in its entirety.

The present application is also related to U.S. patent application Ser. No. 11/428,599 filed Jul. 5, 2006, entitled "Method And Apparatus For Automatically Operating A Game Machine".

In addition, this application claims the benefit of priority of U.S. Provisional Patent Application Ser. No. 60/373,750, filed Apr. 18, 2002, which is incorporated herein by reference.

FIELD OF THE INVENTION

The present invention is concerned with gaming devices such as slot machines, and is more specifically concerned with facilitating operation of gaming devices.

BACKGROUND OF THE INVENTION

A typical session at a slot machine may last two hours or more, and may include approximately 1,000 game play cycles or "spins". Conventional slot machines are somewhat disadvantageous for players in that if the player wishes to take a break for a few moments, as, for example, to sip a drink, have a conversation with a companion or to stretch his or her legs, it may be necessary to interrupt the gaming session. This is inconsistent with a typical player's objective, which is to maximize the number of game play cycles that he or she engages in, so as to maximize the opportunities for winning a jackpot.

Moreover, some slot machine players are of an advanced age, such that repeatedly pulling a slot machine arm or repeatedly pressing a button to initiate a game play cycle may be physically demanding.

It accordingly would be desirable to provide a slot machine that is easier and/or more convenient to play than conventional slot machines, and/or that can accommodate a player's desire to take a break while continuing to play the slot machine.

Also, from the point of view of the casino, it is desirable that the player's gaming experience be improved, and that longer and/or more continuous playing sessions be facilitated.

SUMMARY OF THE INVENTION

To overcome the drawbacks of the prior art, novel methods and apparatus for automating slot machine play are provided. In a first embodiment of the invention, a method is provided including receiving an input that indicates selection of an automated play mode of a gaming device, initiating the automated play mode of the gaming device, and exiting from the automated play mode upon occurrence of an exit event.

According to a further aspect of the invention, a gaming device includes an actuatable portion for indicating selection of an automated play mode of the gaming device and an arrangement for exiting from the automated play mode upon occurrence of an exit event.

According to a further aspect of the invention, a method includes the steps of setting a limiting criterion of play, initiating automated play of a gaming device, and terminating automated play of the gaming device upon occurrence of the limiting criterion.

According to a further aspect of the invention, a method includes determining a limiting criterion of play, initiating automated play of a gaming device, and terminating automated play of the gaming device upon occurrence of the limiting criterion.

The limiting criterion of play may be set or determined based on one or more of player input, data stored in the gaming device, a program which controls the gaming device, data stored in a controller that is in communication with the gaming device, and a program which controls the controller.

According to a further aspect of the invention, a method includes entering a player parameter selection into a gaming device, and initiating automated play of the gaming device based on the player parameter selection.

According to a further aspect of the invention, a method includes entering a player parameter selection into a gaming device, and terminating automated play of the gaming device based on the player parameter selection.

According to a further aspect of the invention, a method includes inputting a player parameter selection into a gaming device, and initiating automated play of the gaming device based on the player parameter selection.

According to a further aspect of the invention, a method includes inputting a player parameter selection into a gaming device, and terminating automated play of the gaming device based on the player parameter selection.

According to a further aspect of the invention, a device includes an arrangement for storing a player parameter selection, an arrangement for initiating automated and repetitive play of a game, and an arrangement for terminating the automated play in accordance with the player parameter selection.

According to a further aspect of the invention, a gaming device includes an arrangement for receiving a player parameter selection, and an arrangement for terminating an automated play session of the gaming device in accordance with the player parameter selection.

According to a further aspect of the invention, a gaming device includes a memory device having a limiting criterion of play stored therein, and a processor in communication with the memory device, where the processor is configured for terminating automated play of the gaming device in accordance with the limiting criterion.

According to a further aspect of the invention, a method includes initiating automated play of a gaming device, and terminating automated play of the gaming device upon occurrence of a limiting criterion.

According to a further aspect of the invention, a method includes initiating automated play of a gaming device, and terminating automated play of the gaming device upon occurrence of an exit event.

According to a further aspect of the invention, a method includes receiving a monetary deposit, and receiving an actuation of an actuatable portion of a gaming device. The actuation may simultaneously indicate (a) selection of an automated play mode of the gaming device, and (b) a number of game play cycles to be performed during the automated play mode.

According to a further aspect of the invention, a gaming device includes a control arrangement for controlling operation of the gaming device, and an actuatable portion in communication with the control arrangement and configured to simultaneously indicate (a) selection of an automated play mode of the gaming device, and (b) a number of game play cycles to be performed during the automated play mode.

According to a further aspect of the invention, a gaming device includes a control arrangement for controlling operation of the gaming device, and a first actuatable portion in communication with the control arrangement. The first actuatable portion may be configured to simultaneously indicate (a) selection of an automated play mode of the gaming device, and (b) a first number of game play cycles to be performed during the automated play mode. The gaming device may further include a second actuatable portion in communication with the control arrangement and configured to simultaneously indicate (a) selection of the automated play mode, and (b) a second number of game play cycles to be performed during the automated play mode.

The actuatable portions referred to in the previous three paragraphs and elsewhere herein may include one or more push buttons and/or regions of a touch screen.

According to a further aspect of the invention, a method includes receiving a first signal that indicates selection of an automated play mode of a gaming device, and, in response to receiving the first signal, prompting a player of the gaming device to confirm selection of the automated play mode. The method according to this aspect of the invention may further include receiving a second signal that indicates confirmation of the selection of the automated play mode, and initiating the automated play mode in response to receiving the second signal.

According to a further aspect of the invention, a gaming device includes a first arrangement for receiving a first signal that indicates selection of an automated play mode of the gaming device, and a second arrangement that is responsive to the first arrangement and is for prompting a player of the gaming device to confirm selection of the automated play mode. The gaming device further includes a third arrangement that is associated with the second arrangement and is for receiving a second signal that indicates confirmation of the selection of the automated play mode, and a fourth arrangement that is responsive to the third arrangement and is for indicating the automated play mode.

According to a further aspect of the invention, a method includes initiating an automated play mode of a gaming device, performing the automated play mode in accordance with a parameter, receiving a signal during the automated play mode, changing the parameter in response to the received signal, and continuing performance of the automated play mode in accordance with the changed parameter.

According to a further aspect of the invention, a method includes performing an automated play mode of a gaming device at a first rate, and receiving a signal during the automated play mode. The method according to this aspect of the invention further includes, in response to the received signal, performing the automated play mode in accordance with a second rate that is different from the first rate.

Thus the signal may cause operation of the automated play mode to be speeded up or slowed down.

According to a further aspect of the invention, a method includes performing an automated play mode of a gaming device such that a first amount is wagered per game play cycle, and receiving a signal during the automated play mode. The method according to this aspect of the invention further includes, in response to the received signal, performing the automated play mode such that a second amount is wagered per game play cycle, where the second amount is different from the first amount.

Thus the signal may cause the automated play mode to be changed so as to increase or decrease the amount wagered per game play cycle.

According to a further aspect of the invention, a gaming device includes a first arrangement for initiating an automated play mode of the gaming device, and a second arrangement that is associated with the first arrangement and is for performing the automated play mode in accordance with a parameter. The gaming device according to this aspect of the invention further includes a third arrangement that is associated with the second arrangement and is for receiving a signal during the automated play mode, and a fourth arrangement that is responsive to the third arrangement and is for changing the parameter. The gaming device according to this aspect of the invention further includes a fifth arrangement for continuing performance of the automated play mode in accordance with the changed parameter.

According to a further aspect of the invention, a method includes initiating an automated play mode of a gaming device, and, during the automated play mode, receiving interaction from a player of the gaming device such that the player performs an earning activity. The method according to this aspect of the invention further includes increasing a credit balance of the gaming device in response to the interaction.

The earning activity may include one or more of answering survey questions, viewing advertisements, and browsing shopping web sites.

According to a further aspect of the invention, a gaming device includes a first arrangement for initiating an automated play mode of the gaming device, and a second arrangement that is associated with the first arrangement and is for receiving during the automated play mode interaction from a player of the gaming device such that the player performs an earning activity. The gaming device according to this aspect of the invention further includes a third arrangement that is responsive to the second arrangement and is for increasing a credit balance of the gaming device.

According to a further aspect of the invention, a method includes initiating an automated play mode of a gaming device, and providing a communications function to a player of the gaming device during the automated play mode.

The communications function may include one or more of providing long distance telephone service to the player and presenting entertainment software such as a motion picture or recorded music to the player.

According to a further aspect of the invention, a gaming device includes a first arrangement for initiating an automated play mode of the gaming device, and a second arrangement for providing a communications function to a player of the gaming device during the automated play mode.

According to a further aspect of the invention, a method includes initiating an automated play mode of a gaming device, and performing a plurality of game play cycles during the automated play mode. The method according to this aspect of the invention further includes providing a first payout as a result of a first one of the game play cycles and providing a second payout as a result of a second one of the game play cycles, the second payout being different from the first payout. The method according to this aspect of the invention further includes delaying a start of a next game play cycle after the first one of the game play cycles and not delaying a start of a next game play cycle after the second one of the game play cycles.

For example, the automated play mode may pause after relatively large payouts, and may continue without pausing after relatively small payouts.

According to a further aspect of the invention, a method includes initiating an automated play mode of a gaming device, and performing a plurality of game play cycles during the automated play mode. The method according to this aspect of the invention further includes providing a first payout as a result of a first one of the game play cycles and providing a second payout as a result of a second one of the game play cycles, where the second payout is different from the first payout. The method according to this aspect of the invention further includes delaying a start of a next game play cycle after the first one of the game play cycles by a first delay period, and delaying a start of a next game play cycle after the second one of the game play cycles by a second delay period that is shorter than the first delay period.

According to a further aspect of the invention, a method includes initiating an automated play mode of a gaming device, and performing a plurality of game play cycles during the automated play mode. The method further includes providing a first payout as a result of a first one of the game play cycles, and providing a second payout as a result of a second one of the game play cycles, the second payout being different from the first payout. The method according to this aspect of the invention further includes interrupting the automated play mode in response to the first payout, and not interrupting the automated play mode in response to the second payout.

According to a further aspect of the invention, a gaming device includes an arrangement for receiving a monetary deposit, and a control circuit that is coupled to the arrangement for receiving a monetary deposit and is configured to (a) initiate an automated play mode of a gaming device, (b) perform a plurality of game play cycles during the automated play mode, (c) provide a first payout as a result of a first one of the game play cycles, (d) provide a second payout as a result of a second one of the game play cycles, where the second payout is different from the first payout, (e) interrupt the automated play mode in response to the first payout, and (f) not interrupt the automated play mode in response to the second payout.

The interruption of the automated play mode may be a temporary pause after which the automated play mode automatically resumes, or may be of indefinite duration (e.g., until input is received from the player). This aspect of the invention may operate such that an automated play mode is interrupted in the event of a relatively large payout, and is not interrupted in the event of a smaller payout.

According to a further aspect of the invention, a method includes initiating an automated play mode of a gaming device, and performing at least one game play cycle during the automated play mode. The method according to this aspect of the invention further includes providing an outcome in a game play cycle during the automated play mode, and, in response to the outcome, (a) initiating a secondary game, and (b) exiting from the automated play mode.

The secondary game may be of the type sometimes referred to as a "bonus round".

According to a further aspect of the invention, a gaming device includes an arrangement for receiving a monetary deposit, and a control circuit coupled to the arrangement for receiving the monetary deposit and configured to (a) initiate an automated play mode of the gaming device, (b) perform a plurality of game play cycles during the automated play mode, (c) provide an outcome in a game play cycle during the automated play mode, and (d) in response to the outcome, (i) initiate a secondary game and (ii) exit from the automated play mode.

According to a further aspect of the invention, a method includes associating a player with a first gaming device and associating the player with a second gaming device. The method according to this aspect of the invention further includes initiating an automated play mode in the first gaming device, and exiting from the automated play mode in response to an event associated with the second gaming device.

For example, a player may simultaneously operate two slot machines, both in automated play modes. A large payout may be made in one of the slot machines, and in response to the payout, both slot machines may exit from the automated play modes.

According to a further aspect of the invention, a method includes associating a player with a gaming device, and initiating an automated play mode of the gaming device. The method according to this aspect of the invention further includes actuating a cash-out function of the gaming device only at a time when a player identification card corresponding to the player is interfaced to the gaming device.

According to a further aspect of the invention, a method includes initiating a first gaming session on a gaming device, and initiating a second gaming session on the gaming device, the second gaming session being concurrent with the first gaming session. The method according to this aspect of the invention further includes displaying information concerning the gaming session on a first display region of the gaming device, and displaying information concerning the second gaming session on a second display region of the gaming device.

For example, two concurrent gaming sessions may be operated in a single slot machine by operating a display of the slot machine in a split-screen mode.

According to a further aspect of the invention, a method includes performing at least one game play cycle in a gaming device. The method according to this aspect of the invention further includes presenting visual information, subsequent to the performing step, where the visual information represents a replay of the at least one game play cycle. The presentation of the visual information may be in response to a player's selection of a review mode of the gaming device.

Systems, apparatus and computer program products are provided for carrying out the above-described embodiments and numerous other embodiments of the present invention. Each computer program product described herein may be carried by a medium readable by a computer (e.g., a carrier wave signal, a floppy disk, a hard drive, a random access memory, etc.).

With the methods and apparatus of the present invention, gaming devices such as slot machines may be easier and/or more convenient for players to operate. For example, a slot machine in accordance with the present invention may allow a player to take a break from paying attention to and/or interacting with the slot machine, with the slot machine continuing to operate and to generate game play cycles while the player is taking a break. The player may be adjacent to the slot machine or may be away from the slot machine while taking his or her break. A slot machine provided in accordance with the invention may promote more continuous and/or more rapid and/or lengthier gaming sessions as compared to a conventional slot machine. The player may find that playing a slot machine of the present invention is more enjoyable and/or less likely to cause fatigue.

The methods and apparatus of the present invention may also make it easier for a player to play two or more slot machines at the same time. Accordingly, the player's opportunities for winning a jackpot may again be increased. Also, the methods and apparatus of the present invention may enable a player to perform his or her intended amount of gaming activity within a shorter period of time, thereby providing the player with additional leisure time in which to engage in other leisure activities, including other activities at the casino.

The methods and apparatus of the present invention may also provide a number of advantages for casinos. For example, by making slot machine play easier and/or more enjoyable and/or more convenient, slot machines in accordance with the invention may attract more players, thereby enhancing the profitability of the casino. Furthermore, slot machines provided in accordance with the invention may reduce the number of breaks from gaming activity taken by players and/or may allow a player's gaming activity to continue even while the player takes a break. Consequently, the slot machines of the present invention may encourage more gaming activity. The methods and apparatus of the present invention may also encourage more gaming activity by allowing players to have longer gaming sessions and/or by allowing gaming activity to be performed more rapidly. Also, the present invention may aid players in operating two or more slot machines at the same time, thereby again increasing gaming activity at the casino. In addition, by helping players to operate two or more slot machines at a time and/or to spend longer periods of time playing slot machines, the present invention may reduce periods of time in which slot machines are not used.

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

The present invention is described with reference to the accompanying drawings. In the drawings, like reference numerals indicate identical or functionally similar elements.

FIG. 5 illustrates a sample of the contents of the session database of FIG. 4;

FIG. 6 illustrates a sample of the contents of the auto-play database of FIG. 4;

FIG. 7 illustrates a sample of the contents of the exit event database of FIG. 4.

DETATILED DESCRIPTION OF THE INVENTION

Figure 1:
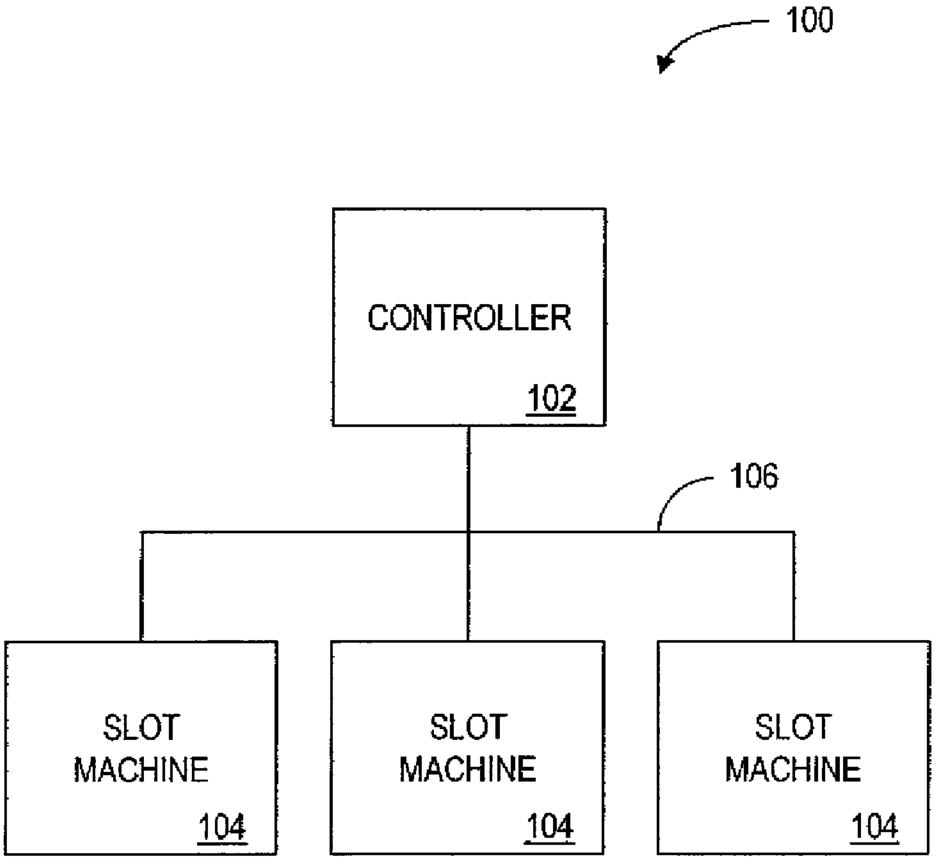
FIG. 1 is a schematic diagram of a novel system in which one or more embodiments of the invention may be applied.

Novel methods, apparatus, systems and computer program products are provided that allow automated operation of a slot machine such that player input required to initiate, perform and/or complete a game play cycle is reduced or eliminated. For example, when a player first arrives at a slot machine, he or she may obtain a credit balance at the slot machine in any conventional manner, including by inserting money into the slot machine. (Before, after or during the obtaining of the credit balance, the player may insert his or her player tracking card in a card reader of the slot machine or may otherwise interface his or her player tracking card to the slot machine.) The player may then provide input to the slot machine to indicate that an automated play mode is desired. Such an input may include pressing an "auto-play" button or a multi-play (e.g., "10 play", "50 play", "100 play", etc.) button. Instead of pressing a button to provide such input, a suitable region on a touch screen may be actuated. If necessary, selection of an automated play mode may cause the slot machine to prompt the player to input one or more parameters that may govern performance and/or termination the automated play mode. Such parameters may include an amount to be wagered in each game play cycle and/or a rate at which game play is to proceed during the automated play mode. One or more other parameters may control termination of the automated play mode, and may include a total number of game play cycles to be performed during the automated play mode or a total time duration of the automated play mode.

Upon entry of parameters, if required, and/or upon selection of the automated play mode, the automated play mode begins. The player may be present at the slot machine during the entire duration of the automated play mode, or the player may be away from the slot machine for part or all of the automated play mode. In the automated play mode, game play cycles may be performed one after the other without any input from the player. For example, upon termination of one game play cycle, another game play cycle may be commenced, either immediately or after a predetermined delay period, without the player having been required to press a "play" or "spin" button or pull a handle of the slot machine. Each game play cycle during the automated play mode may include placing of a wager, generation of a random number or pseudo random number and/or spinning of slot machine reels or displaying of simulated spinning reels, determination of an outcome (e.g., a combination of slot reel indicia and/or an indication of winning or losing and/or an indication of an amount won) and possibly a payout to be credited to a credit balance of the slot machine and/or to be dispensed via a hopper of the slot machine. As noted above, upon the outcome or indication of the outcome to the player and/or a payout, if any, one game play cycle ends, and a next game play cycle may begin automatically, with or without a delay between the two game play cycles.

The automated play mode may continue, with or without user input, until an exit event occurs. The exit event may be, for example, completion of a number of game play cycles which was indicated by the player to be the desired number of game play cycles for the automated play mode. Another type of exit event may be depletion of the credit balance in the slot machine. Another type of exit event may be expiration of a previously set time period for the intended duration of the automated play mode. The exit event may, but need not, correspond to a parameter selected or indicated by the player.

Another possible type of exit event may be awarding of a certain type or amount of payout or jackpot. Another type of exit event may be an indication by a player that he or she wishes the automated play mode to end (e.g., the player presses a "stop auto-play" button). Exiting from the automated play mode in response to an exit event may be temporary or permanent.

The automated play mode provided in accordance with the invention may make it easier and/or more convenient and/or more enjoyable to play slot machines. The automated play mode may make it possible for a player to take a break from playing activity, either while staying at the slot machine and observing operation of the slot machine, or upon leaving the slot machine while continuing to have the slot machine operate on his or her behalf and/or on his or her account. Gaming activity at a slot machine may be performed more rapidly and/or more continuously and/or with fewer interruptions by means of the automated play mode of the present invention. A player may be less likely to become fatigued, and may engage in more and/or more rapid gaming activity, thus increasing the player's opportunities to win a jackpot, while also enhancing the casino's opportunities for profit on gaming activity.

Many other advantageous features may be provided in accordance with an automated play mode, as described below.

Relevant Terminology

As used herein, an "automated play mode" includes a mode of operation of a gaming device in which a new game play cycle is commenced after termination of a game play cycle without receiving a player input that requests the new game play cycle. Either a delay or no delay may be provided between the end of one game cycle and the automatic commencing of the next game cycle in an automated play mode. Commencing of a new game play cycle may occur automatically in some cases but not in others during an automated play mode. For example, a new game play cycle may be commenced automatically after a losing game play cycle but the gaming device may wait for player input before commencing a new game play cycle after some or all winning game play cycles.

As used herein, a "gaming device" may include a slot machine and/or a slot machine in combination with a slot machine controller or slot server, and may also include a computer, personal digital assistant, or cell phone that is communication with an on-line casino (e.g., a gaming website).

As used herein, a "slot machine" includes an electronic or electromechanical device that is operated by a player to play a game of chance. Examples of slot machines include traditional slot machines that comprise spinning reels or present simulations of spinning reels, video poker machines, video blackjack machines, and pachinko machines. The term "slot machine" also includes a device located at a table game that facilitates wagering or other activity in regard to the table game.

As used herein, a "game play cycle" includes a sequence of events in which (a) a wager is initiated or made (either by a player or automatically by a gaming device), (b) an outcome is provided (e.g., a random number and/or a set of reel indicia or other indicia is provided) and (c) the wager is disposed of and/or a payout is provided in accordance with the outcome (the payout may be made, for example, by applying a credit to a credit balance).

As used herein, a "winning game play cycle" is a game play cycle in which a winning outcome is produced.

As used herein, a "losing game play cycle" is a game play cycle in which a winning outcome is not produced.

As used herein, "receiving a monetary deposit" includes any conventional manner of obtaining credit in a gaming device, including receiving a deposit of coins or tokens, having paper currency inserted in a bill-receiving device of a gaming device, charging or being authorized to charge a credit card account, a debit card account or an account maintained with a casino, and/or transferring value from a value card, a smart card or a magnetic stripe card.

As used herein, a "rate" of an automated play mode is determined in terms of game play cycles performed per unit of time; for example, the rate of an automated play mode in which 20 game play cycles are performed in five minutes is slower than the rate of an automated play mode in which 25 game play cycles are performed in five minutes.

As used herein, "earning activity" includes a player answering one or more survey questions, viewing advertisements and/or shopping on-line and/or accepting an offer from a third party and/or any other activity on the part of a player (other than initiating or participating in a game play cycle or making a monetary deposit into a slot machine) for which a casino or a third party is willing to confer a benefit upon the player. "Shopping" includes receiving and/or accepting an offer of a product or service.

As used herein, a "communications function" includes transmitting audio and/or visual information to and/or from a player, including presenting pre-recorded material such as a motion picture to the player, where the information is not pertinent to (i) a game play cycle, (ii) an automated play mode, (iii) payment of funds to or from the gaming device, or (iv) any other operational function of the gaming device.

As used herein, a "player parameter selection" includes both play options and limiting criteria of play.

As used herein, a "play option" includes any information used to define automated play. Examples of play options are an amount to be wagered per game play cycle and a time between game play cycles.

As used herein, a "limiting criterion of play" is any information that may define the beginning or end of an automated play mode. In one or more embodiments of the invention, limiting criteria may include lock start time, lock end time, requested number of game play cycles, credit balance, total losses, total winnings, and limiting maximum payout. Expiration or depletion of all available credits for playing a slot machine may constitute a limiting criterion of play. A specific winning credit value (e.g., stop playing if a credit of $1,000.00 is ever registered) may also be a limiting criterion of play. A limiting criterion of play need not be a player parameter selection.

For example, a limiting criterion may be set by the gaming device itself or by a controller or may be programmed into the gaming device or controller.

As used herein, "depletion" of a credit balance includes reduction to zero or reduction to an amount that is less than a wager amount that is applicable per game play cycle in an automated play mode. "Depletion" may also include reduction of the credit balance to or below a predetermined level that may have been set by the player, by the gaming device, or by the controller.

As used herein, a "controller" includes a computer system operated by a casino and in communication with one or more slot machines.

As used herein, "to exit" includes terminating, pausing, suspending, disengaging, stopping, ending, halting, freezing, closing or otherwise exiting an automated play mode.

As used herein, an "exit event" includes any stimulus, interrupt, condition, signal, criterion, exception or other event that causes or may cause a gaming device to exit from an automated play mode. An "exit event" also includes an event corresponding to a limiting criterion of play. For example, if a limiting criterion has been set, determined or selected as n game play cycles, completion of the nth game play cycle of the automated play mode is an exit event. Other examples of exit events are an indication or other signal by a player to indicate that the player wishes to terminate an automated play mode, and depletion of a credit balance of a gaming device.

As used herein, a "player" includes one person or a group of persons who place wagers on the operation of a gaming device. Such wagers may be made in connection with an automated play mode.

As used herein, a "payout" includes an amount greater than zero that is credited to a credit balance of a gaming device in response to a winning game play cycle.

As used herein, "inputting" includes any manner of providing an input, a signal, a stimulus, an indication, data or information to a device, and includes actuating an actuatable portion of the device and/or transmitting a signal to the device from another device.

As used herein, "entering" includes "inputting".

As used herein, an "actuatable portion" of a device is any portion of a device that may be touched or moved by a player to generate a signal in the device and/or to change a state or condition of the device.

As used herein, a "secondary game" is an activity of a gaming device that includes an outcome and is initiated as a result of an outcome of a game play cycle and either (a) requires player input where the game play cycle did not require player input, or (b) requires a different type of player input from the game play cycle.

As used herein, a "player identification card" includes a player tracking card, a credit card or a debit card.

A gaming machine should be understood to "receive" (as that term is used herein and in the appended claims) an input, a signal, data or information upon actuation of an actuatable portion of the gaming machine (e.g., a push button, a keypad, a keyboard, a region of a touch screen) and/or upon receipt of a signal generated by a device exterior to the gaming machine.

As used herein, a "payout" includes an amount greater than zero that is credited to a credit balance of a slot machine in response to a winning game play cycle.

Exemplary Embodiments of the Inventive System

FIG. 1 is a schematic diagram of a novel system 100 in which one or more aspects of the present invention may be applied. The novel system 100 includes a controller 102 in communication with a plurality of slot machines 104. The controller 102 and the slot machines 104 will be described further below. As will be understood from subsequent discussion, one or more of the slot machines 104, and/or the controller 102 may have features provided in accordance with the invention. Although three slot machines 104 are shown in the drawing, it should be understood that any number of slot machines may be connected to the controller 102. Also, as will be discussed below, it is contemplated to omit the controller 102 and to omit any communication among the slot machines 104, so that one or more aspects of the invention are provided in one or more of the slot machines 104 taken as stand-alone devices. It is also contemplated that one or more aspects of the invention be provided in connection with one or more of the slot machines 104, but not in connection with others of the slot machines 104. It is also contemplated that the slot machines may differ from each other in other respects, including different capabilities for game-playing and/or different numbers and/or types of reels or reel displays. It is also contemplated that some of the slot machines 104 may be reel-type (or virtual reel-type) machines, whereas others of the slot machines 104 may include video poker machines and/or video blackjack machines. Other combinations of slot machines 104 in the system 100 are contemplated.

Those skilled in the art will understand that devices in communication with each other need only be capable of communicating with each other and need not be continually transmitting data or receiving data from each other. On the contrary, such devices need only transmit data to or receive data from each other as necessary, and may actually refrain from exchanging data most of the time. Further, devices may be in communication even though steps may be required to establish a communication link (e.g., dialing a network service provider).

The communication between the controller 102 and the slot machines 104 may be via one or more communication networks, generally indicated by reference numeral 106 in FIG. 1. The communication between the controller 102 and the slot machines 104 may include one or more of: (a) transmission of information from the controller 102 to a slot machine 104 (e.g., to control operation of the slot machine 104); and (b) transmission of information from one or more of the slot machines 104 to the controller 102 (e.g., information concerning a player's gaming activities).

The communication network or networks 106 may be constituted, for example, by one or more of a local area network (LAN), a wide area network (WAN), the Internet, a telephone line or telephone lines, a cable line or cable lines, a radio channel or channels, an optical communications line or lines, a satellite communications link or links.

One or more of the following communications protocols may be used, for example: Ethernet, Bluetooth, TCP/IP.

Some or all of the communications between the controller 102 and the slot machines 104 may be encrypted to ensure privacy and prevent fraud.

Exemplary Embodiments of a Slot Machine 104

Figure 2:
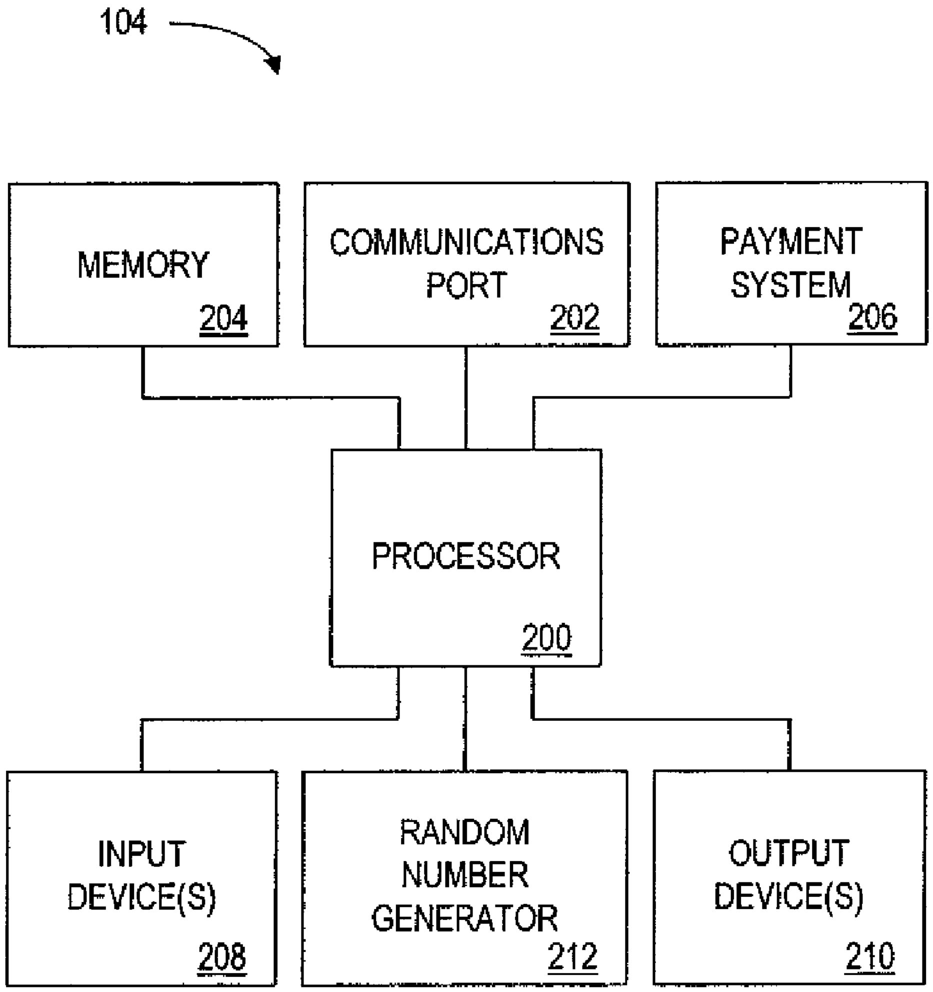
FIG. 2 is a schematic diagram of an exemplary embodiment of a slot machine of FIG. 1.
Figure 3:
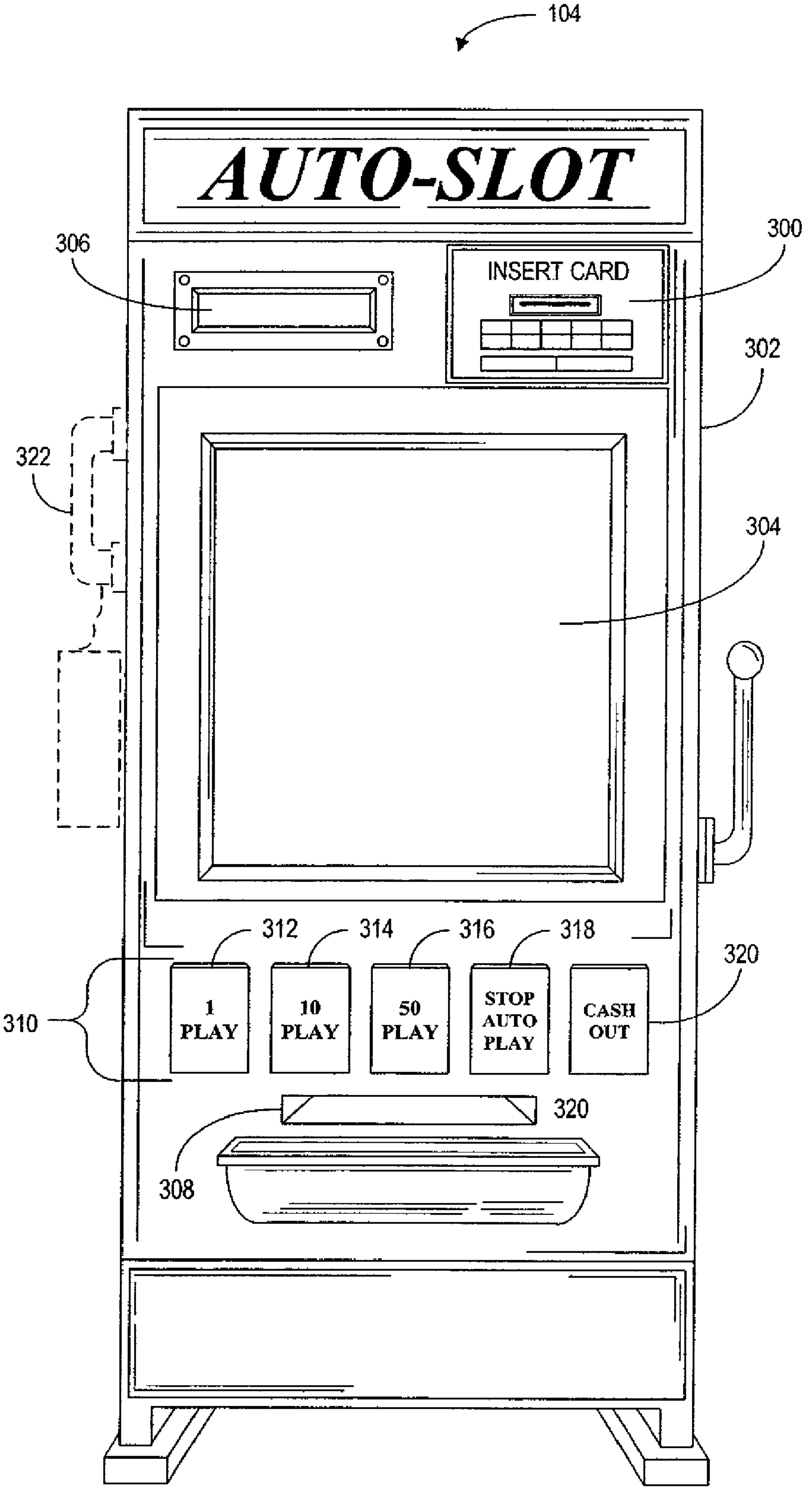
FIG. 3 is a schematic front view of an exemplary embodiment of the slot machine of FIG. 2.

FIG. 2 is a schematic diagram of an exemplary embodiment of one or more of the slot machines 104 of FIG. 1; and FIG. 3 is a schematic front view of an exemplary embodiment of the slot machine of FIG. 2.

The slot machine 104 may have all of the components of a conventional slot machine, such as a reel-type or simulated-reel-type slot machine, a video poker machine or a video blackjack machine. The schematic representations of FIGS. 2 and 3 are somewhat simplified, and it accordingly should be understood that conventional slot machine components may be present notwithstanding that such components are not explicitly indicated in FIGS. 2 and 3.

With reference to FIG. 2, the slot machine 104 comprises a processor 200, such as one or more conventional microprocessors (e.g., one or more Intel® Pentium® processors). The processor 200 is in communication with a communications port 202, through which the processor 200 communicates with the controller 102. The communications port 202 may also include a capability for wireless communication with, e.g., PDA's and the like. It should also be understood that the communications port 202 may, but need not, be arranged to provide wireless communication with the controller 102.

One or more memory devices are represented by block 204, and are associated with the processor 200. The memory device or devices represented by block 204 may include conventional volatile and/or non-volatile memory that may function as program storage and/or working memory. The memory 204 may store information related to or indicated by player input, including one or more player parameter selections. A program stored in the memory 204 may control the processor 200 such that the slot machine 204 performs one or more of the processes described herein.

The slot machine 104 also includes a payment system 206 which is in communication with the processor 200. The payment system 206 performs two primary functions: (a) receiving payments from players to load wagering credits into the slot machine 104, and (b) making payments to players to pay out winnings and/or unused wagering credits. Accordingly, the payment system 206 may include one or more conventional devices to receive coins and/or bills and/or tokens, as exemplified by a bill receiver 300 shown in FIG. 3. In addition, or alternatively, the payment system 206 may include a magnetic stripe card reader (not separately shown) which handles credit card or debit card reading to allow for automatic charging or debiting of a player's credit card or debit card account. In addition, or alternatively, the payment system 206 may accommodate a transfer of value from a value card (e.g., a smart card or a magnetic stripe card) or charging of an account maintained by a player with the casino. It should be understood that the payment system 206 may include any and all arrangements for allowing the slot machine 104 to receive a monetary deposit.

In addition, the payment system 206 may include a conventional hopper controller (not separately shown) which controls dispensing of coins and/or tokens from a conventional hopper (not separately shown) in response to awarding of a jackpot and/or the player exercising a cash-out option. In addition, or alternatively, the payment system 206 may include another arrangement or other arrangements for making payments to a player.

The payment system 206 may include capabilities for providing payment to a player by one or more of dispensing hard currency (i.e., coins or bills), dispensing an alternate currency (e.g., a paper cashless gaming voucher, a coupon, a casino token), crediting a player account (e.g., a bank account, credit card account or other financial account), or providing a product or service to a player (e.g., arranging for transfer to the player of a new car or other product as a jackpot prize). In connection with crediting a player account, such account may be identified by a payment identifier such as a credit card number, a debit card number or a player tracking card number.

It should be also understood that at least some of the above-described functionality of the payment system 206 may be implemented by activities of the processor 200 operating under control of a program stored in the memory 204.

One or more components of the payment system 206 may operate under control of the processor 200.

The slot machine 104 also includes one or more input devices 208 and output devices 210 that are in communication with the processor 200. The input devices 208 may include one or more devices arranged to provide input to the processor 200. For example, the input devices 208 may include one or more push buttons (as described below in connection with FIG. 3, for example), a touch screen (which may also be one of the output devices 210), a conventional slot machine pull-handle and/or a magnetic stripe card reader arranged to read a player tracking card. Other possible input devices 208 include a computer keyboard, a keypad, a computer mouse, a microphone, a video camera, a biometric input device (e.g., a fingerprint or retinal scanner), a radio antenna (e.g., for receiving inputs from another slot machine or from a PDA) and a speech recognition module. Conceptually, the input devices 208 may also overlap with the payment system 206 in that, for example, a coin or bill acceptor may be considered an input device 208.

The output devices 210 may include, for example, a video monitor (e.g., a touch screen, as referred to above), a bell or buzzer that is activated to indicate a winning outcome, and an LED display which may indicate a player's credit balance in the slot machine 104. Other possible output devices 210 may include an audio speaker, an electric motor, a printer (e.g., for outputting a receipt to indicate credits to which the player is entitled), a coupon or product dispenser, an infrared port (e.g., for communicating with another slot machine and/or with a PDA), a Braille computer monitor. Conceptually the output devices 210 may again overlap with the payment system 206 in that a coin or bill dispenser may be considered an output device 210.

Another component of the slot machine 104 may be a random number generator 212. The random number generator 212 may be provided in accordance with conventional practices in association with the processor 200 to generate random or pseudo-random numbers by which game outcomes may be determined. It will be appreciated that the random number generation function may alternatively be handled by the processor 200 operating under control of a program stored in the memory 204.

It should be understood that hard-wired circuitry (not shown) may be included in the slot machine 104 to perform functions in addition to or in place of functions that may be performed by the processor 200 under control of a stored program. Accordingly, it is contemplated to replace the processor 200 and the memory 204 partially or completely with hard-wired circuitry.

Further aspects of an exemplary slot machine 104 will now be discussed with reference to FIG. 3. As shown in FIG. 3, a slot machine 104 includes, in one embodiment, a housing 302 in or on which most or all of the components described in FIG. 2 may be mounted.

The exemplary slot machine 104 shown in FIG. 3 has a display 304 which may display simulated slot machine reels, in a conventional manner. The display 304 may be or may include a touch screen (not separately shown). The display screen 304 may also display messages in accordance with the invention relating to an automated play mode of the slot machine 104 and features related to the automated play mode. The exemplary slot machine 104 also includes an LED display 306 which may display a player's credit balance in the slot machine 104 in a conventional manner. The exemplary slot machine 104 also includes a conventional coin outlet 308 by which coin jackpots may be dispensed in a conventional manner.

Furthermore, in accordance with the invention, the exemplary slot machine 104 includes an array of push buttons 310. The array of push buttons 310 includes a "1 play" button 312, a "10 play" button 314, a "50 play" button 316, a "stop 10 auto-play" button 318, and a "cash-out" button 320.

The "1 play" button 312 may be actuated by a player to initiate a single game play cycle of the slot machine 104 in a conventional manner. The "10 play" button 314 is provided in accordance with an aspect of the invention, and may be actuated by the player to indicate simultaneously (a) selection of an automated play mode of the slot machine 104 and (b) that the automated play mode should have a duration of 10 game play cycles. (That is, actuation of the "10 play" button 314 indicates a limiting criterion of play corresponding to 10 game play cycles.)

Similarly, the "50 play" button 316 is provided in accordance with an aspect of the invention, and may be actuated by the player to simultaneously indicate (a) selection of the automated play mode of the slot machine 104 and (b) that the duration of the automated play mode should be 50 game play cycles.

The "stop auto-play" button 318 is also provided in accordance with an aspect of the invention, and may be actuated by the player during the automated play mode of the slot machine 104 to indicate that the player wishes to terminate the automated play mode. It will be recognized that actuation of the "stop auto-play" button 318 may constitute an "exit event" as that term is defined above.

The "cash-out" button 320 is also actuatable by the player. Actuation of the "cash-out" button may invoke a conventional cash-out option, whereby the slot machine 104 (and particularly the payment system 206, FIG. 2) provides payment to the player of winnings and/or an unused credit balance in the slot machine 104 in any conventional manner.

It should be understood that the array of push buttons 310 may include additional buttons for simultaneously selecting the automated play mode and indicating a number of game play cycles to be included in the automated play mode. For example, a "25 play" button and/or an "100 play" button may also be provided. Alternatively, either or both of the "25 play" button and the "100 play" button may be substituted for either or both of the illustrated buttons 314 and 316. Moreover, either one of the buttons 314 and 316 may be omitted. In general, it is contemplated that the slot machine 104 may have one or any other number of push buttons, each of which indicates selection of an automated play mode and also specifies a number of game play cycles to be included in the automated play mode. The specified number of game play cycles may be any number of game play cycles that is greater than one.

It should also be understood that any one or more of the push buttons in the array 310 of push buttons may be replaced by a corresponding region of a touch screen.

Still further, it is contemplated to omit the "stop auto-play" button 318, in which case the slot machine 104 may be arranged to operate such that the duration of the automated play mode is limited only by a specified number of game play cycles or the available credit balance. In connection with any of the above alternatives, it is also contemplated that the automated play mode may be terminated or temporarily interrupted upon the occurrence of some or all winning outcomes.

As will be understood from subsequent discussion, it is also contemplated to provide slot machines in accordance with the invention in which automated play modes are initiated and/or player parameters are selected without the use of push buttons (or corresponding touch screen regions) like the "10 play" button 314 and the "50 play" button 316. In such embodiments, it is contemplated to entirely omit any such mechanism for simultaneously indicating selection of the automated play mode and indication of a number of game play cycles to be included in the automated play mode.

Although not shown in FIG. 3, the slot machine 104 may also have one or more input devices (e.g., push buttons, touch screen regions) by which the player may indicate an amount (e.g., number of credits or coins) to be wagered per game play cycle.

Exemplary Embodiments of the Controller 102

Figure 4:
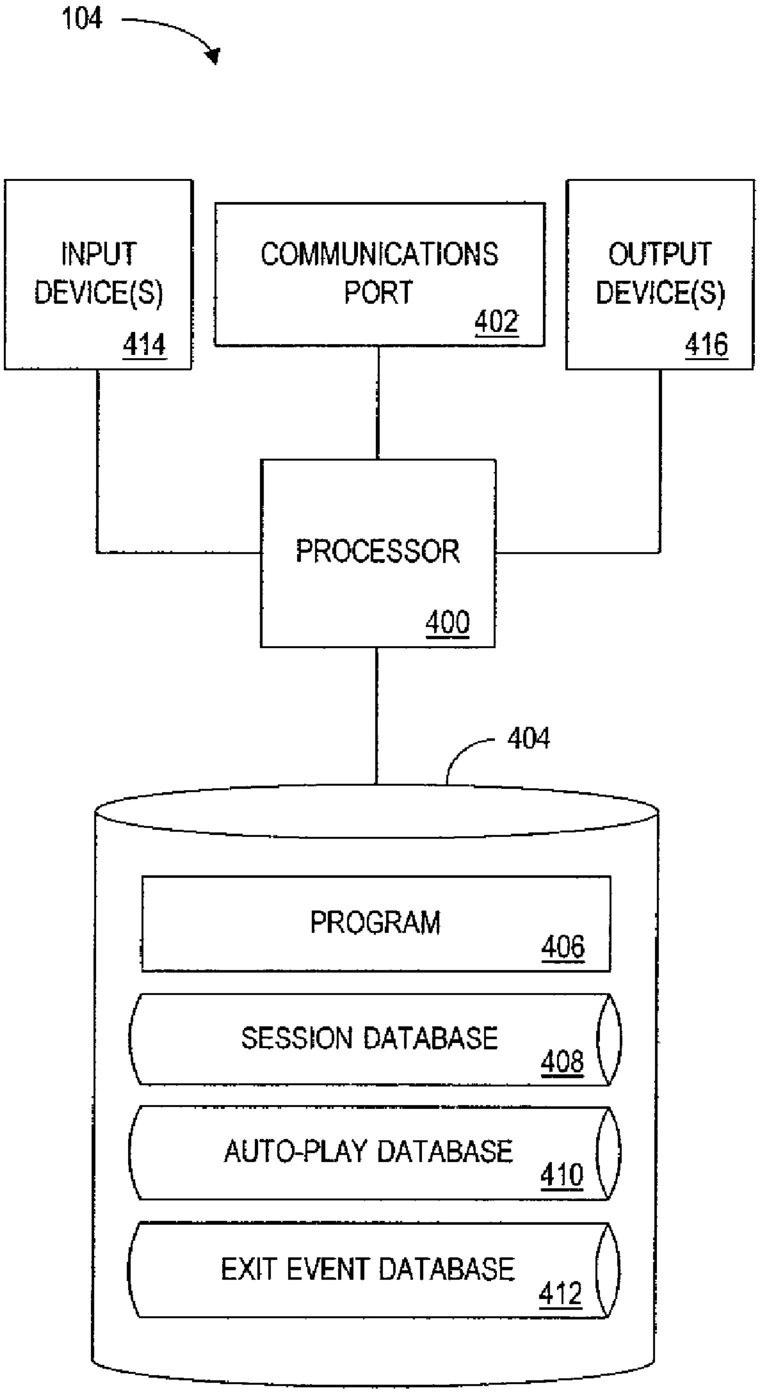
FIG. 4 is a schematic diagram of an exemplary embodiment of the controller of FIG. 1.

FIG. 4 is a schematic diagram of an exemplary embodiment of the controller 102 of FIG. 1. The controller 102 may be implemented as a system controller, as a dedicated hardware circuit, as an appropriately programmed general purpose computer, or as any other equivalent electronic, mechanical or electromechanical device.

With reference to FIG. 4, the controller 102 comprises a processor 400, such as one or more conventional microprocessors (e.g., one or more Intel® Pentium® processors). The processor 400 is in communication with a communications port 402 through which the processor 400 communicates with other devices (e.g., with the slot machines 104). The communications port 402 may include multiple communication channels for simultaneous communication with a plurality of slot machines 104. As previously stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 400 is also in communication with a data storage device 404. The data storage device 404 may comprise an appropriate combination of magnetic, optical and/or semiconductor memory, and may include, for example, random access memory (RAM), read only memory (ROM), a compact disc and/or a hard disk. The processor 400 and the data storage device 404 each may be, for example, located entirely within a single computer or other computing device; or connected to each other by a communication medium, such as a serial port cable, a telephone line or a radio frequency transceiver. Alternatively, the controller 102 may comprise one or more computers that are connected to a remote server computer (not shown) for maintaining databases.

The data storage device 404 may store, for example, (i) a program 406 (e.g., computer program code and/or a computer program product) adapted to direct a processor 400 in accordance with the present invention, and particularly in accordance with the processes described herein; (ii) a session database 408 adapted to store information regarding gaming sessions at slot machines 104; (iii) an auto-play database 410 adapted to store information about gaming sessions that are in an automated play mode; and (iv) an exit event database 412 adapted to store information about exit events that may cause a slot machine 104 to pause, suspend or terminate an automated play mode. The program 406 may be stored in a compressed, an uncompiled and/or an encrypted format, and may include computer program code that allows the controller 102 to employ the communications port 402 to communicate with the slot machines 104 to:

1. track monetary receipts and disbursements of the slot machines 104;
2. track gaming activities of individual players;
3. track gaming session activities at the slot machines 104; and/or
4. manage automated play modes of the slot machines 104.

The computer program code required to implement the above functions (and the other functions described herein) can be easily developed by a person of ordinary skill in the art, and is not described in detail herein. The controller 102 may include any peripheral devices required to implement the above functionality. Such peripheral devices are represented in FIG. 4 by blocks 414 and 416 (representing, respectively, input devices and output devices), which may include, for example, telephone keypads, handsets, headsets, microphones, speakers, keyboards, computer displays, etc. The program 406 may also include program elements such as an operating system, a database management system, and device drivers that allow the processor 400 to interface with computer peripheral devices (e.g., a video display, a keyboard, a computer mouse, etc.).

Note that instructions of the program 406 may be read into a main memory (not shown) of the processor 400 from a computer readable medium other than the data storage device 404, such as from a ROM or from a RAM. While execution of sequences of instructions in the program 406 causes the processor 400 to perform the process steps described herein, hard-wired circuitry may be used in place of, or in combination with software instructions for implementation of the processes of the present invention. (Such is also the case with regard to processes implemented in one or more of the slot machines 104.) Thus, embodiments of the present invention are not limited to any specific combination of hardware and software. The processor 400 also may be in communication with a clock (not shown) that supplies time and date information to the processor 400 and/or controls timing of operations of the processor 400. The clock may be a clock external to the processor 400 or may alternatively be a clock internal to the processor 400 or a clock embodied within the program 406 (e.g., based on a system clock which is not shown).

The controller 102 could be implemented as two or more interconnected controllers.

Exemplary Embodiments of the Databases

Samples of the contents of the session database 408, of the auto-play database 410 and of the exit event database 412 (shown in association with the controller 102 as illustrated in FIG. 4) are shown in FIGS. 5-7, respectively. The specific data and fields illustrated in these drawings represent only one embodiment of the records stored in the databases of the invention. The data and fields of these databases can be readily modified, for example, to include more or fewer data fields. A single database also may be employed. Note that in the databases of the controller 102, a different reference numeral is employed to identify each field of each database. However, in at least one embodiment of the invention, fields that are similarly named (e.g., session identifier fields) store similar or the same data in a similar or in the same data format.

It should also be noted that some or all of the data or types of data illustrated in FIGS. 5-7 may be stored and managed in individual ones of the slot machines 104, and may be used therein to manage automated play modes of the slot machines 104.

The session database 408 contains information related to gaming sessions that are taking place in various ones of the slot machines 104. FIG. 5 illustrates a sample of the contents of the session database 408. As shown in FIG. 5, the session database 408 contains information related to six ongoing sessions, identified in records 502-512, respectively. Specifically, for each session, the session database 408 contains records having fields corresponding to, for example, (1) a session identifier 514, used by the controller 102 to identify the session; (2) a game designation 516 which indicates what game is being played in the session (e.g., what type of slot machine, video poker machine, or video blackjack machine is being played in the session); (3) a player identifier 518 used by the controller 102 to identify the player who is playing the session (the player identifier may be used to reference information stored in a player database (not shown); a player database may store information about a player and his or her gaming activities; examples of information that may be stored in a player database include a player's name, home address, hotel, year-to-date theoretical win, year-to-date win, player tracking card number, and payment identifier); (4) a quantity 520 of credits which corresponds to the credit balance in the slot machine in which the session is being played; (5) a start time 522 which indicates the time and date when the session began; (6) a games played FIG. 524 which indicates the number of game play cycles that have been played so far in the session; and (7) an indication 526 as to whether an automated play mode is currently in effect in the session.

Although not shown in FIG. 5, the session database 408 could also include an additional field that stores, for each session, a machine identifier that specifically identifies the particular slot machine that is being played in the session.

Note that the session database 408 may be populated with data provided to the controller 102 via the communications port 402, and that, except for the session identifier 514, the data may be provided to the controller 102 from the slot machines 104. The session identifier 514 may be assigned to each session by the controller 102 at the time when the respective slot machine 104 indicates that a gaming session has begun. The player identifier 518 may be provided to the controller 102 by the respective slot machine 104 based on data read from a player tracking card by a player tracking card reader of the respective slot machine 104.

The auto-play database 410 contains information about sessions that are in an automated play mode. FIG. 6 illustrates a sample of the contents of the auto-play database 410. As shown in FIG. 6, the auto-play database 410 contains information relating to six sessions that are identified in records 602-612, respectively. Specifically, for each session, the auto-play database 410 contains records having fields corresponding to, for example, (1) the session identifier 614 (which corresponds to the session identifier 514 of the session database 408); (2) an indication 616 as to the current status of the automated play mode in the session; (3) an indication 618 of the amount to be wagered on each game play cycle of the automated play mode; (4) an indication 620 as to how fast the automated play mode is running; and (5) identifiers 622 of exit events, the occurrence of which would result in pausing, other interruption, or termination of the automated play mode.

The status field 616 may indicate, for example, that an automated play mode is "in progress". Considering the entry in the status field 616 for the record 604, it will be noted that there is an indication that the automated play mode is both "in progress" and "locked". The "locked" indication indicates that the player has invoked an option which allows the player to prevent any other player from using the slot machine 104 in question while the automated play mode continues, thereby allowing the player to leave the slot machine 104 unattended while the automated play mode continues in operation. The "locked" status of the slot machine 104 may continue after termination of the automated play mode and until the slot machine 104 is "unlocked" by the player. Other features of the locking option are described in the above-referenced U.S. Pat. No. 6,244,957, and need not be further described herein.

It will be understood that the data contained in fields 618 and 620 are indicative of "player parameter selections", and more particularly are indicative of "play options" as those terms are defined above. In regard to the "speed of play" field 620, a "medium" entry (as in record 612) may correspond, for example, to game play at a rate of three game play cycles per minute. A "slow" speed of play entry (as in record 606) may correspond to fewer than three game play cycles per minute, and a "fast" speed of play entry (as in record 602) may correspond to more than three game play cycles per minute.

The exit event database 412 contains information related to exit events that may cause a slot machine 104 to pause, suspend, interrupt or terminate an automated play mode. FIG. 7 illustrates a sample of the contents of the exit event database 412. As shown in FIG. 7, the exit event database 412 contains information in regard to nine exit events corresponding to records 702-718, respectively. Specifically, for each exit event, the exit event database 412 contains records having fields corresponding to, for example, (1) an exit event identifier 720 that identifies the exit event (and at least some of which may have been stored ill the exit events field 622 of the auto-play database 410); (2) a description 722 of the exit event in question; and (3) a message 724 to be displayed to the player upon the occurrence of the exit event and the corresponding pausing, suspension, interruption or termination of the automated play mode.

The exit event which corresponds to the record 702 occurs upon depletion of a credit balance in the slot machine 104 to less than a predetermined level. The predetermined level may have been selected by the player, programmed into the slot machine 104 or set by the controller 102.

The exit event which corresponds to the record 704 is a winning outcome of a game play cycle, such as a jackpot. In alternative embodiments, every jackpot may be an exit event, or only some jackpots (e.g., jackpots of more than a certain amount) may be exit events. Again, such an exit event may be player-selectable, programmed into the slot machine 104 or settable by the controller 102.

The exit event that corresponds to the record 706 is the expiration of a predetermined length of time after the beginning of the session (or after the beginning of an automated play mode). This could be a typical player-selectable parameter (i.e., a "limiting criterion of play", as that term is defined above, which may be selectable by the player). Alternatively, such a limiting criterion may be programmed into the slot machine 104 or settable by the controller 102.

The exit event that corresponds to the record 708 is a malfunction of the slot machine 104. In an exemplary embodiment, this exit event may be programmed into the slot machine 104 or set by the controller 102.

The exit event that corresponds to the record 710 is the occurrence of a "bonus round". As is familiar to those who are skilled in the art, a "bonus round" is sometimes also referred to as a "secondary game", as that term is defined above. The secondary game may require player input that cannot be or is not automatically supplied, and therefore suspension of the automated play mode may be required until the player completes the bonus round.

In one type of secondary game, the player may be presented, via a display of the slot machine 104, with a plurality of "hiding" locations, behind one of which a cartoon character is "hiding". The player is prompted to pick a hiding location. If the player picks correctly, a relatively large payout may be provided. If the player picks incorrectly, a smaller payout may be provided.

The exit event that corresponds to the record 712 is the actuation by the player of an actuatable portion of the slot machine 104. Implementing an exit event of this type makes it possible for a player to terminate an automated play mode at any time.

The exit event that corresponds to the record 714 is based on a set of outcomes of game play cycles. In the particular example illustrated in the record 714, the automated play mode is paused to allow the slot machine 104 to prompt the player to consider changing a player parameter selection (that is, in this case, a play option related to the rate at which the automated play mode is performed).

The exit event that corresponds to the record 716 is a level of credit balance that exceeds a predetermined level. In a typical embodiment of the invention, the predetermined level may be a limiting criterion of play that is set by the player.

The exit event that corresponds to the record 718 is a combination of two conditions, of which one relates to the depletion of the credit balance below a predetermined level and the second relates to a play option. In this case, the exit event may cause the automated play mode to be paused while the player is prompted to consider changing the play option.

Exemplary Operation of the Novel System 100

FIGS. 8-11 are flow charts of exemplary processes of the novel system 100 of FIGS. 1-7. In particular, the processes of FIGS. 8-11 relate to various embodiments of automated play modes for one or more of the slot machines 104. The processes of FIGS. 8-11 may be embodied within computer program code of the program 406 of the controller 102 and may comprise a computer program product. Alternatively, one or more of the processes of FIGS. 8-11 or portions thereof, may be embodied within computer program code stored in the memory 204 (FIG. 2) of one or more of the slot machines 104.

Figure 8:
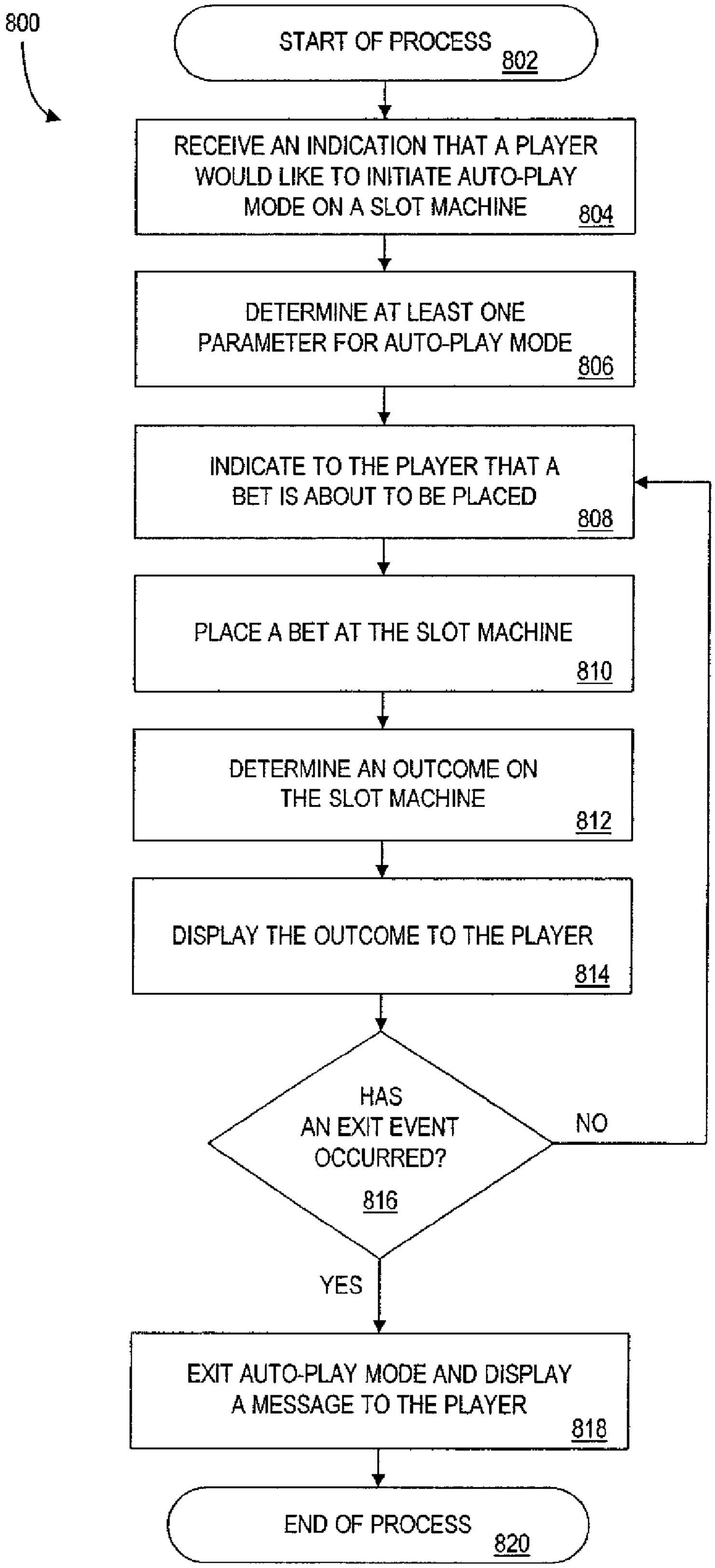
FIGS. 8-11 are flow charts of exemplary processes of the novel system of FIGS. 1-7.

An exemplary process 800 performed by the novel system 100 of FIGS. 1-7 is illustrated in FIG. 8. Although not indicated in the drawing, it is assumed that a player has established a credit balance in a slot machine 104 on the basis of, for example, any technique by which the slot machine may receive a monetary deposit, as discussed above. The player may also have inserted his or her player tracking card into the slot machine 104 so that the slot machine 104 reads the player's player identifier from the player tracking card. A record like the records 502-512 (FIG. 5) may be established in the session database 408.

Referring again to FIG. 8, the process 800 begins at 802, and proceeds to a step 804. At step 804 an indication is received that a player wishes to initiate an automated play mode of one of the slot machines 104. The indication may be received in a number of ways. For example, the player may actuate an input device 208 (FIG. 2), for example an actuatable portion, of the slot machine 104 to indicate that the player wishes to enter an automated play mode. One such actuatable portion may be a button (not separately shown) on the slot machine 104 that is labeled "auto-play". To cause initiation of an automated play mode of the slot machine 104 the player may push the button.

As an alternative, the player may push a button such as the buttons 314 and 316 shown in FIG. 3 which indicate a number of game play cycles that the automated play mode is to include, in addition to selecting the automated play mode.

As another alternative, the display 304 may display a message such as, "Do you wish to engage auto-play mode?" The player may then select the automated play mode by touching a suitable region on a touch screen.

It is also contemplated that a player may indicate selection of an automated play mode by communicating with the slot machine 104 via a PDA or a cellular telephone.

It is further contemplated that the player may indicate his or her desire to select an automated play mode by speaking to a casino employee The casino employee may then indicate to the controller 102 that an automated play mode should be initiated on the slot machine 104.

It is further contemplated that the process of selecting an automated play mode may require confirmation on the part of the player. For example, when the player presses an "auto-play" button on the slot machine 104, the slot machine 104 may display a message such as "Are you sure that you want to enter auto-play mode?". The player may then actuate a suitable region on a touch screen to confirm that he or she wishes to select the automated play mode.

It is contemplated that, in addition to displaying the message prompting the player to confirm selection of the automated play mode, the slot machine may also display information which describes the automated play mode to the player to aid the player in understanding how the automated play mode functions. Such information may include any information that is needed to satisfy legal or regulatory requirements in regard to the automated play mode.

Confirmation of the employee's desire to select the automated play mode may also occur in a conversation between the player and a casino employee. During the conversation, the employee may provide to the player information about the operation of the automated play mode.

The player may be required to enter into an agreement before the automated play mode is initiated. The agreement may set forth terms and conditions in regard to operation of the automated play mode. The player may indicate acceptance of the agreement, for example, by providing a suitable input to the slot machine 104.

Requiring confirmation of selection of the automated play mode may be advantageous in preventing players from accidentally entering into the automated play mode. The confirmation procedure may also ensure that the player understands how the automated play mode operates and how the player may interact with the slot machine 104 during the automated play mode. Confirmation may also be a legal or regulatory requirement.

It is also contemplated that the option of selecting the automated play mode may not be provided to all players. For example, the casino may operate such that the automated play mode is available only to certain preferred players. Such preferred players may identify themselves to the slot machines 104 by means of their player tracking cards.

As another alternative, the automated play mode may be a feature which is only provided to a player upon a winning outcome of a game play cycle conducted in a manual play mode.

It is further contemplated to charge a fee to a player as a condition of accessing the automated play mode.

According to other aspects of the invention, an automated play mode may be initiated upon the occurrence of initiation events that are not player inputs. For example, an automated play mode may be initiated without player input upon the occurrence of certain game play cycle outcomes. Alternatively, the controller may select one or more slot machines 104, on a random basis or otherwise, to enter into an automated play mode. In such cases, the automated play mode may be initiated in response to a signal received by a slot machine 104 from the controller 102. When automated play modes are initiated without being selected by the player, it may be the case that the gaming activity during the automated play mode is "free" or a bonus for the player. That is, the game play cycles may proceed without charging wagers to the credit balance in the slot machine. During such a bonus automated play mode, the player may receive the benefit of winning outcomes.

Also, the controller 102 may operate so as to limit the number of slot machines that a single player may simultaneously operate in the automated play mode. For example, the player may be prevented from simultaneously operating more than three slot machines in the automated play mode.

Another possible requirement may be that the automated play mode may be available to be selected by the player only when the player's player tracking card is interfaced to the slot machine and/or that operation of the automated play mode will not occur except when the player's player tracking card is interfaced to the slot machine.

Referring again to FIG. 8, step 806 follows step 804. At step 806, one or more parameters for the automated play mode are determined. Examples of parameters for an automated play mode include an amount to be wagered on each game play cycle of the automated play mode. (It should be noted that step 806, or a portion of step 806, may occur prior to step 804. For example, the player may select a wager amount prior to indicating selection of the automated play mode. One or more other parameters may then be determined after selection of the automated play mode.) The amount of the wager for each game play cycle may be fixed or variable. For example, the wager may be one coin or one credit for each game play cycle. Alternatively, there may be a wagering pattern, such as, for example, wagering one coin on the game play cycle which occurs immediately after a losing outcome, and wagering two coins on a game play cycle that occurs immediately after a winning outcome.

As another example of a wagering pattern, three coins may be wagered on every game play cycle until ten losing outcomes in a row occur. After a sequence of ten losing outcomes, one coin may be wagered on each game play cycle until two consecutive winning outcomes occur. Upon the occurrence of the two consecutive winning outcomes, the wager per game play cycle may be restored to three coins.

As still another example, the amount to be wagered on each game play cycle may be determined randomly based, for example, on output from a random number generator.

Other wagering patterns and/or methods of determining an amount of a wager for a game play cycle are contemplated.

Another example of a parameter that may be determined at step 806 is a rate at which the automated play mode is performed. The rate of the automated play mode may be a function of a length of a delay between the completion of one game play cycle and commencing the next game play cycle during the automated play mode. Alternatively, or in addition, the rate of the automated play mode may be a function of how long it takes to perform a game play cycle (e.g., how long reels spin during a game play cycle). Either or both of a delay between game play cycles and a length of time required to perform a game play cycle may be determined at step 806. Alternatively, the rate of the automated play mode may be determined simply in the form of game play cycles per unit time (e.g., ten game play cycles per minute).

It is contemplated that there may be no delay between the conclusion of one game play cycle and starting the next game play cycle in the automated play mode. If there is a delay between succeeding game play cycles in the automated play mode, the slot machine 104 may display a message during the delay such as "Auto-play in effect. The next play begins in 3 seconds . . . 2 seconds . . . 1 second . . . ."

Either with or without a delay between successive game play cycles, a message such as, "Press the 'stop' button to exit from auto-play" may be displayed. It may be most desirable not to provide a delay between successive game play cycles, since the absence of a delay may maximize the number of game play cycles that are performed.

Another parameter that may be determined at step 806 is the content of a message or messages to be displayed, or other information to be provided to a player during the automated play mode. For example, the automated play mode may be operated such that spinning reels are displayed and the outcome is shown only when the game play cycle results in a winning outcome.

As another example, one parameter setting may call for a message such as "In auto-play mode, press any button to exit from auto-play mode". According to an alternative parameter setting, no such message is displayed.

In connection with implementations of the present invention in video poker machines or video blackjack machines, a parameter for the automated play mode may indicate whether decision rules are to be utilized in performing game play cycles, or whether input from the player will be required for game play cycles. For example, according to an aspect of the invention, in a video poker machine, a decision rule may operate to automatically select which cards to discard from the initial hand. In a video blackjack machine, a decision rule may operate to determine whether or not to request an additional card. According to one parameter setting, one or more decision rules are applied so that game play proceeds without any input from the player. According to another parameter setting, each game play cycle pauses for player input as to the play of the current hand. In the latter case, the gaming device may operate such that once a hand is completed, the next hand is dealt automatically without input from the player. It is also the case that game play may be partly governed by one or more decision rules, while also allowing for some player input into the game play cycle.

Where decision rules are required, the same may be stored, for example in a decision rule database (not shown) in the controller 102. Alternatively, a decision rule database may be stored in one or more of the individual slot machines 104.

One or more parameters determined at step 806 may be an exit event.

Exit events may fall into one or more of the following categories, among others: indications provided by a player; conditions relating to a credit balance in the slot machine; events arising in or as a result of one or more game play cycles; emergencies and machine malfunctions; occurrences of points in time; conditions relating to a player's gaming history; events relating to other activities performed by a player; conditions or events relating to revenue management of a casino; events or conditions at other slot machines operated by the player; events or conditions relating to individuals other than the player.

Indications provided by a player that may be taken as an exit event include actuation of an actuatable portion of the slot machine 104 (e.g., touching a particular region of a touch screen or a particular button (e.g., an "end auto-play" button). Pressing any button or touching any part of a touch screen may also be taken as an exit event. Other specific buttons that may be pressed to cause an exit event may be a "cash-out" button, a "play" or "spin" button, a "change request" button or a "stop" button.

A player may also be permitted to indicate an exit event by inserting his or her player tracking card into the slot machine or removing his or her player tracking card from the slot machine.

It is contemplated that any one or more, or none, of those player indications may be an exit event in a particular embodiment of the invention.

An example of an exit event relating to a credit balance in the slot machine includes the credit balance being reduced to less than a certain level, where the certain level may be, for example, an amount to be wagered per game play cycle, or a level that has been selected by the player.

The credit balance reaching a level that is higher than a certain level (e.g., a level selected by the player) may also constitute an exit event. Also, receiving a monetary deposit (e.g., insertion of a coin into the slot machine) could be an exit event.

The following are examples of events related to one or more game play cycles that could be exit events. Winning of any payout (e.g., a jackpot) greater than a predetermined amount could be an exit event. The predetermined amount could be selected by the player or set or programmed into the slot machine 104 or the controller 102. It is also contemplated to have an exit event be winning of a payout of less than a certain amount. It is further contemplated that any winning outcome could be an exit event, or that a losing outcome may be an exit event. A "winning streak" could also be an exit event. A winning streak could be defined in a number of different ways. For example, winning at least four of the last ten game play cycles could be considered a winning streak. Alternatively, a winning streak could be three consecutive game play cycles that all produce winning outcomes.

A losing streak could also be an exit event. Again, a number of different definitions of losing streaks could be used. For example, ten consecutive game play cycles without a winning outcome could be considered a losing streak. Alternatively, twenty consecutive game play cycles which produce fewer than two winning outcomes could be considered a losing streak.

Also, as discussed above, an outcome which results in a "bonus round" could be an exit event.

Exit events could also occur in the case of emergencies such as fire, theft or a power outage in the casino or a jam or other malfunction in the slot machine. An indication of tampering with the slot machine may also be an exit event.

Time-based exit events may include the following. For example, a player may select a particular time at which the automated play mode is to end. In one example, if the player wishes to see a movie at 7:30 p.m., he or she may select 7:00 p.m. as the end of the automated play mode. Alternatively, at the beginning of the automated play mode, the player may indicate that he or she desires that the automated play mode end upon the expiration of one hour. The duration the automated play mode may also have been set by or programmed into the slot machine 104 or the controller 102. Alternatively, the controller may set a particular future time to end an automated play mode to allow for pre-scheduled maintenance of the slot machine.

One or more of the following events relating to a player's gaming history may be an exit event: the player's session win reaches a level that is above or below a certain value; the player's session theoretical win reaches a level that is above or below a certain value; the player's session coin-in reaches a level that is above or below a certain value; the player's year-to-date win reaches a level that is above or below a certain value; the player's year-to-date theoretical win reaches a level that is above or below a certain value; the player's year-to-date coin-in reaches a level that is above or below a certain value.

The player receiving or requesting a complimentary product or service or accepting or rejecting a subsidy offer may also be an exit event.

To provide an example of an exit event arising from revenue management concerns of a casino, suppose that more than 90% of the slot machines in a casino are currently in use, and that one of the slot machines is being operated in an automated play mode at a slow speed. The controller may then determine an exit event for that particular slot machine and may prompt the player to resume automated play at a faster speed. In this way, the casino can operate to maximize the usage of its slot machines.

The following are examples of an event occurring in one slot machine that functions as an exit event for another slot machine.

Suppose that a player is simultaneously operating three slot machines, each in an automated play mode. If one of the three slot machines hits a jackpot, this may be an exit event for all three slot machines.

In another example, a player may be simultaneously be playing two slot machines, one in an automated play mode, and the second in a manual mode. If the player presses the "cash-out" button in the slot machine that is being operated in the manual mode, this may be an exit event for the automated play mode in the other slot machine.

As still another example, three traveling companions may be registered together with the controller 102, which may provide a link among three respective slot machines that the traveling companions are each operating in an automated play mode. When one of the three companions presses a button on his or her slot machine to exit from the automated play mode, this may be an exit event for the slot machines operated by the other two companions.

As still another type of exit event, suppose that a player is simultaneously playing two sessions on a single slot machine, both in an automated play mode. (The two session may be presented in split screen form on a single display, as discussed below.) Winning a jackpot in one of the sessions may be an exit event for both sessions. Alternatively, depletion of the credit balance in the slot machine may be an exit event for both sessions.

Exit events may be events that correspond to limiting criteria of play. One example of an event that corresponds to a limiting criterion of play might be the completion of the tenth game play cycle of an automated play mode for which ten game play cycles is a limiting criterion of play. Another example of an event that corresponds to a limiting criterion of pay might be occurrence of a total session loss that equals or exceeds a total session loss amount that was set as a limiting criterion of play. Still another example of an event that corresponds to a limiting criterion of play might be occurrence of a payout that equals or exceeds a payout amount that was set as a limiting criterion of play.

In at least one embodiment of the invention, one or more parameters determined at step 806 (FIG. 8) may be determined on the basis of an indication by a player.

For example, either before or after indicating selection of the automated play mode, a player may use the input device 208 (FIG. 2) of the slot machine 104 (e.g., by actuating an actuatable portion such as a push button, a numeric keypad or a touch screen region) to select an amount to be wagered on each game play cycle and/or to select a rate of the automated play mode. In one embodiment, in response to the player selecting the automated play mode in step 804, the slot machine 104 may prompt the player to select an amount to be wagered on each game play cycle during the automated play mode. A parameter value selected by a player need not be indicated in exact terms. For example, a touch screen may present the player with options for "fast", "standard" or "slow" rates of play.

As another example, a player may select one or more exit events by using an input device 208. For example, a touch screen may present to the player options such as "exit on any payout" and "exit on payouts in excess of $250.00". The player may select one of these options by touching a corresponding region of a touch screen.

As another example, a player may indicate his or her identity to the slot machine by inserting his or her player tracking card. Based on the identification of the player, the controller may access a player database (not shown) to retrieve the player's preferences for automated play mode. One or more parameters for the automated play mode may be set on the basis of the retrieved player preferences. Alternatively, the player's preferences for automated play mode may be stored on the player tracking card and read from the player tracking card by the slot machine to set one or more parameters for the automated play mode.

As another example, the player may indicate a parameter such as the number of game play cycles to be included in the automated play mode at the same time that the automated play mode is selected by, for example, pressing one of the buttons 314, 316 discussed in connection with FIG. 3.

In one example given above, the controller 102 determines one or more parameters for an automated play mode in a slot machine 104 based on player preferences stored in a database. One or more parameters for an automated play mode may be determined by a controller in other ways. For example, a controller may access a database to determine a standard set of parameters for an automated play mode. The set of parameters may include one or more exit events.

As part of step 806, a record like the records 602-612 (FIG. 6) may be established in the auto-play database 410.

Referring again to FIG. 8, step 808 follows step 806. At step 808, the slot machine 102 indicates to the player that a wager is about to be made. This may be done, for example, by displaying a suitable message to the player on a display of the slot machine 104.

Following step 808 is step 810. At step 810, a wager is made for the current game play cycle. The amount of the wager may be in accordance with a parameter that was selected by the player, determined by the controller 102, or programmed into the slot machine 104. The amount of the wager may be an integral number of coins or credits or another monetary amount. In one embodiment of the invention, wagering of a fraction of a credit or coin may be supported. The amount of the wager may be determined in accordance with a betting pattern, as described above. Alternatively, the slot machine 104 or the controller 102 may determine the amount of the wager based on other conditions. For example, suppose that the player has selected an ending time for the automated play mode that is twenty minutes later than the current time, and also suppose that the credit balance in the slot machine 104 is only $10.00. In such a case, the slot machine 104 or the controller 102 may reduce the amount wagered per game play cycle to a minimum amount.

Each wager may be deducted from the credit balance in the slot machine. Alternatively, the player may be prompted to deposit money to cover the wager. Players may find it most convenient to make a substantial monetary deposit before or at the beginning of the automated play mode, and to have each wager during the automated play mode automatically deducted from the resulting credit balance.

Step 812 follows step 810. At step 812 an outcome of the current game play cycle is determined. The outcome may be determined in a conventional manner based, for example, on a random number or pseudo-random number generated by the random number generator 212 (FIG. 2) with the corresponding outcome being looked up in a look up table based on the random number or pseudo-random number.

Following step 812 is step 814. At step 814, the outcome is displayed to the player. This also may be done in a conventional manner, such as by presenting a simulated display of spinning slot reels, and stopping the spinning reels to reveal a combination of slot reel indicia that corresponds to the outcome determined at step 812.

If the outcome is a winning outcome, step 814 may also include indicating a payout to the player and increasing the credit balance in the slot machine 104 by the amount of the payout. If the outcome determined at step 812 calls for a bonus round, information related to the bonus round may be displayed, and player input required for the bonus round may be received. It is also contemplated that the slot machine 104 may be arranged to provide required input for a bonus round in the place of the player, when the bonus round occurs during an automated play mode.

Following step 814 is a decision block 816. At decision block 816 it is determined whether an exit event has occurred.

Performance of decision block 816 may include referring to relevant data in the auto-play database 410 (FIG. 6) and in the exit event database 412 (FIG. 7). In addition or alternatively, the determination as to whether an exit event has occurred may be based wholly or in part on information stored in the memory 204 of the slot machine 104.

If it is determined at decision block 816 that no exit event has occurred, then the process 800 of FIG. 8 loops back to step 808. That is, a new game play cycle is initiated, without the player pressing a "play" button or pulling a handle, or otherwise providing input to the slot machine 104.

Until it is determined in decision block 816 that an exit event has occurred, the process 800 of FIG. 8 loops through steps 808-816, and game play cycles continue to be automatically initiated and performed. As noted above, if the slot machine 104 is a video poker machine or a video blackjack machine or otherwise requires player input during performance of a game play cycle, the player input may be either automatically supplied by the slot machine 104 based on one or more decision rules, or the player input may be provided by the player.

When it is determined at decision block 816 that an exit event has occurred, then a step 818 follows the decision block 816.

At step 818 the slot machine 104 exits from the automated play mode and a suitable message is displayed to the player.

As will be understood from previous discussion, the exit from the automated play mode may be temporary or permanent. For example, if the exit event was the player's actuation of a "stop auto-play" button, the exit from the automated play mode may be permanent (subject to the player again selecting automated play mode) and the slot machine 104 may enter into a manual play mode in which each game play cycle must be initiated by pushing a "play" button or pulling a handle. A suitable message in such a case may be: "Auto-play ended at player request. Press '1 play' button to spin reels. Press 'auto-play'" button to re-enter auto-play mode."

In another case, where the exit event is depletion of the credit balance of the slot machine 104, the exit from the automated play mode may be temporary, and a monetary deposit in the slot machine 104 to replenish the credit balance may cause the automated play mode to resume automatically. A suitable message in such a case might be: "Credit balance=0. Deposit money to resume auto-play."

In still another case, assume that the exit event was a jackpot. In this case the exit from the automated play mode may merely be a pause and the message could be "You just won a jackpot of $100! Auto-play paused. Press 'stop' button to exit from auto-play. Auto-play resumes in 15 seconds." Then a countdown could be provided if the player did not hit the "stop" button.

Finally in FIG. 8, reference numeral 820 indicates the end of the process after step 818.

Although not indicated in FIG. 8, it is contemplated that a monetary deposit may be made in the slot machine 104 during the automated play mode, without interfering with or interrupting the automated play mode. In one embodiment, a monetary deposit may be made during an automated play mode by automatically charging a credit card account, a debit card account, a casino account or other financial account of the player when the credit balance in the slot machine 104 falls below a predetermined level.

Figure 9:
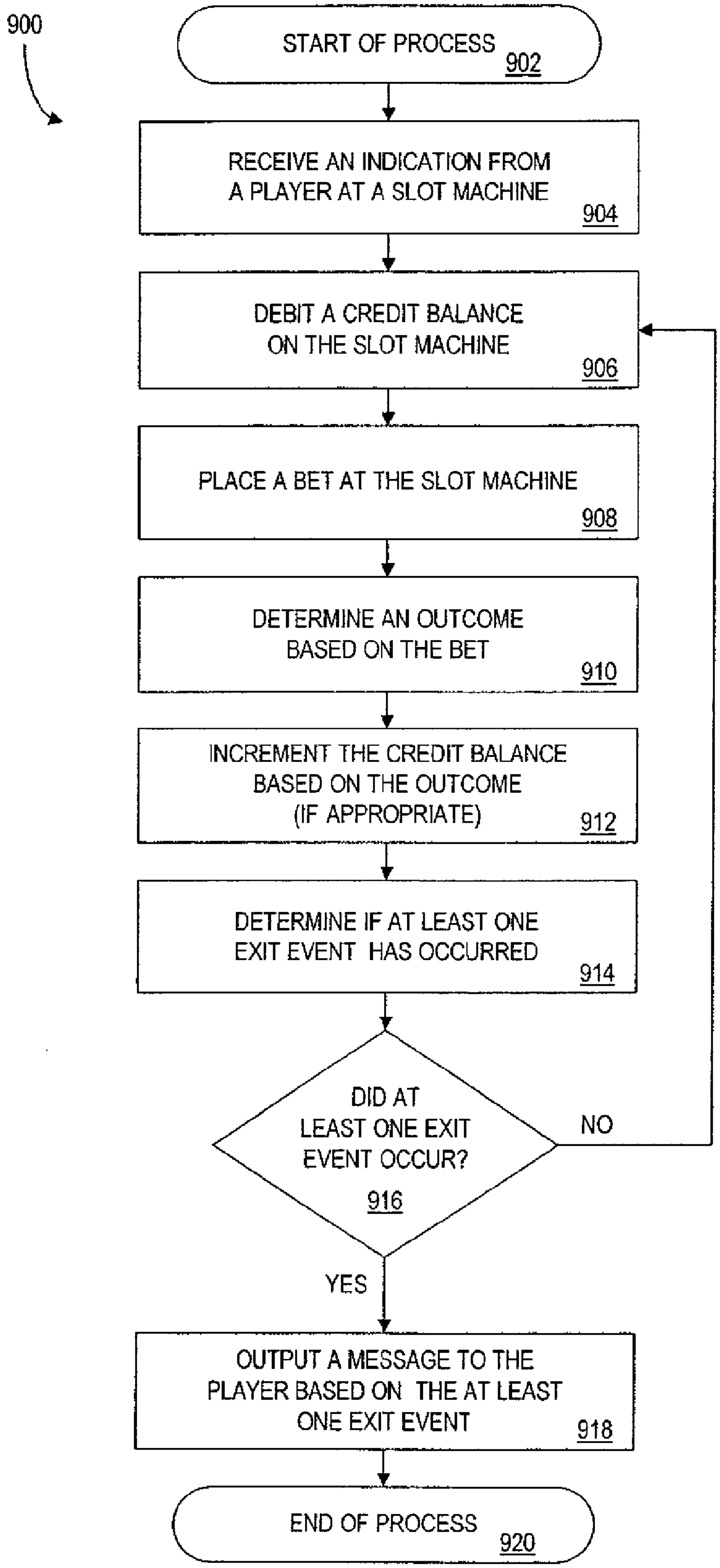

An alternative process 900 for performing an automated play mode in a slot machine 104 is illustrated in FIG. 9. The process 900 of FIG. 9 starts at 902 and proceeds to a step 904.

At step 904, the slot machine 104 receives an indication from a player. Step 904 may, for example, be the same as the step 804 described in connection with FIG. 8. However, it is also contemplated that step 904 may not include an indication from the player that the player wishes to operate the slot machine 104 in an automated play mode. Rather, the player may have merely indicated that he or she wished to play the slot machine 104, and the slot machine 104 may then automatically initiate an automated play mode. In one embodiment, the indication received in step 904 may consist of the player making a monetary deposit in the slot machine 104 and interfacing his or her player tracking card with the slot machine 104.

Following step 904 is step 906. At step 906 an amount is debited from the credit balance to cover a wager on the current game play cycle. The amount of the wager may have been determined by the player, by the slot machine 104 or by the controller 102. In one embodiment, the slot machine 104 may be arranged such that it can only accommodate a wager of one credit on each game play cycle.

Following step 906 is step 908. At step 908 the wager is made. Step 908 may, for example, be the same as step 810 discussed in connection with FIG. 8.

Following step 908 is step 910. At step 910 an outcome for the current game play cycle is determined. Step 910 may, for example, be the same as step 812 which was described in connection with FIG. 8.

Following step 910 is step 912. At step 912, if the outcome determined at step 910 was a winning outcome, the resulting payout may be applied to increase the credit balance. (Alternatively, the payout may be made by dispensing coins, tokens, or the like to the player.) If the outcome determined at step 910 is not a winning outcome, then step 912 may be skipped.

Following step 910 or step 912, as the case may be, is step 914. At step 914, it is determined whether an exit event has occurred. The determination whether an exit event has occurred may be made by the controller 102 and/or by the slot machine 104. The determination may be made based on one or more of an input received by the slot machine 104 (e.g., actuation of a "stop auto-play" button), data stored in the slot machine 104 (e.g., a credit balance) or stored in the controller 102 (e.g., an exit event description 722, FIG. 7) and/or an output from a clock device (not shown) which indicates the current time. If an exit event has more than one condition, it is contemplated that a Boolean expression may be evaluated to determine whether the exit event has occurred.

In one embodiment of the invention, there may be only one possible exit event, namely depletion of the credit balance. In another embodiment, there are only two possible exit events, namely depletion of the credit balance or an indication by the player that the player desires to terminate the automated play mode. In a third embodiment of the invention, there are only three possible exit events, namely depletion of the credit balance, player indication to terminate the automated play mode, and a winning outcome (such as a payout in excess of a predetermined amount). In still another embodiment of the invention, the only possible exit events are the three exit events set forth in the previous sentence plus completion of a number of game play cycles indicated by actuation of a button like the buttons 314 and 316 of FIG. 3. Embodiments that provide for other permutations or subsets of these four exit events are also contemplated.

In one or more embodiments of the invention, as noted above, a payout in excess of a predetermined amount may be an exit event, whereas a payout that is not in excess of the predetermined amount is not an exit event. In such an embodiment, a number of game play cycles may be performed in an automated play mode and then one game play cycle may result in a payout that is large enough to be an exit event. The automated play mode is then interrupted and the player is informed of the payout and of the interruption of the automated play mode. The player may then cause the automated play mode to resume and a number of further game play cycles may be performed. One of the further game play cycles may result in a payout that is not large enough to be an exit event. Accordingly, the automated play mode continues without interruption.

In another possible sequence of events in this embodiment of the invention, a number of game play cycles may be performed in an automated play mode and then one game play cycle may result in a payout that is not large enough to be an exit event. The automated play mode continues without interruption and a number of further game play cycles may be performed. One of the further game play cycles may then result in a payout that is large enough to be an exit event, upon which the automated play mode is interrupted.

In another embodiment of the invention, there may be a pause of one duration in the automated play mode in the event of a payout of one amount and there may be a pause of a longer duration, or an interruption of the automated play mode pending player input, in the event of a payout of another amount. For example, there may be a brief pause and notification to the player in the event of a small payout, and there may be a long pause and notification to the player in the event of a large payout. Alternatively, in the event of a large payout the automated play mode may be halted and the player may be informed of the payout and prompted to indicate whether he or she wishes to end the automated play mode or to resume the automated play mode. In this case the automated play mode would not resume unless the player indicated that he or she wished that the automated play mode resume.

Continuing to refer to FIG. 9, a decision block 916 follows step 914. At decision block 916, it is determined whether an exit event has occurred. If not, then the process 900 of FIG. 9 loops back to step 906, and the automated play mode continues. However, if it is determined at step 916 that an exit event has occurred, then step 918 follows. At step 918, a suitable message is presented to the player. For example, a message presented to the player may depend on what type of exit event occurred. In any case, following step 918, the process 900 ends, as indicated at 920.

While it is contemplated to practice the invention such that quite complex exit events and other parameters related to the automated play mode may be selectable by the player and/or settable by the slot machine 104 and/or the controller 102, it is also contemplated that in some embodiments few if any parameters may be settable by the player with respect to the automated play mode. It is also contemplated that the parameters which govern the automated play mode may be few in number and may not be varied. It is also contemplated, as stated above, that only a few types of exit events may be applicable to the automated play mode. In one or more other embodiments there are no player selectable parameters in regard to the automated play mode (i.e., "one size fits all").

In one such embodiment (suitable for implementation in a stand-alone slot machine and/or a slot machine which is in communication with a conventionally programmed controller) the only mechanism provided for a player to select the automated play mode may be a "10 play" button (or touch screen region). In this embodiment there are no other buttons for selecting automated play mode nor any other button to select a different number of plays, except perhaps for a "1 play" button (which does not select the automated play mode). The parameters governing the automated play mode, such as exit events, rate of play and amount wagered per game play cycle, are fixed and programmed into the slot machine 104. The set of exit events applicable to the automated play mode is not subject to selection by the player and may include all or a subset of the following: (a) depletion of credit balance, (b) player actuation of "stop auto-play" button (or, in one variation, some other button), (c) completion of tenth game play cycle, (d) outcome providing bonus round, (e) any winning outcome (or, alternatively a payout or jackpot in excess of a certain amount, such as $100.00).

An embodiment of the type just described may be advantageous in that only a modest redesign of a conventional slot machine and limited programming effort may be required to implement the embodiment, and the player interface may be simple and easy to understand.

Certain variations or additional features may be provided with respect to this embodiment without adding significant complexity. For example, the standard duration of the automated play mode could be a number of game play cycles other than ten. As another example, the player could be allowed to select only one parameter, such as amount wagered per game play cycle. The exit from the automated play mode upon a winning outcome or bonus round could be a temporary pause (e.g., with a countdown) rather than permanent. Also, after an exit from the automated play mode due to depletion of the credit balance, the automated play mode could resume automatically upon deposit of additional funds in the slot machine 104. The embodiment need not include a bonus round feature.

Figure 10:
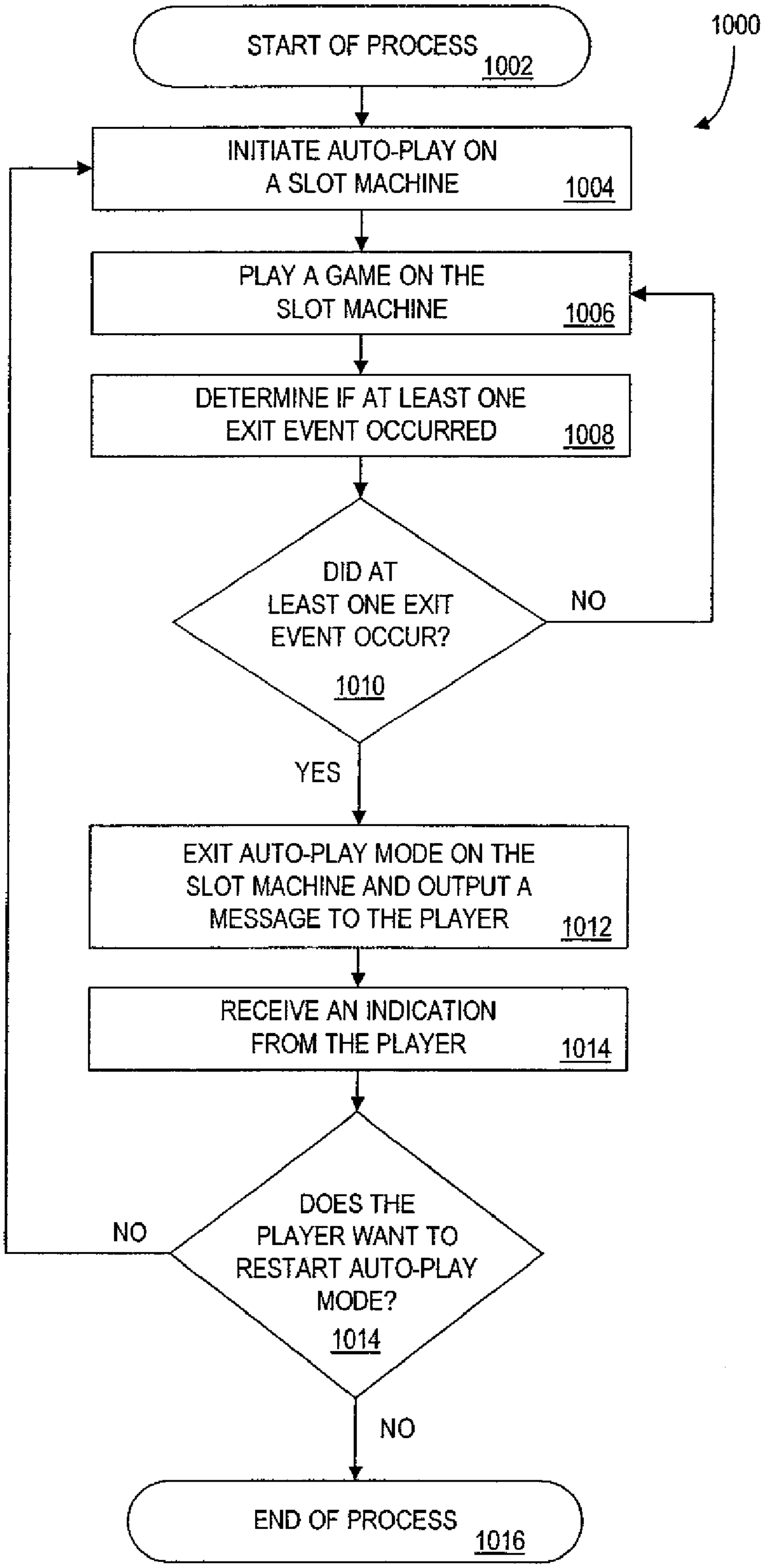

A process 1000, which is another exemplary embodiment of the invention, is illustrated in FIG. 10. The process 1000 starts at 1002 and proceeds to a step 1004. At step 1004 an automated play mode is initiated in a slot machine 104. This may occur, for example, upon a player actuating a button 314 or a button 316 illustrated in FIG. 3. Alternatively, initiation of the automated play mode may occur in response to the player actuating an "auto-play" button or by selecting an option from a menu presented on a display of the slot machine 104. As still another alternative, the automated play mode may be initiated in response to the player completing a selection of parameters for the automated play mode or upon the player confirming selection of the automated play mode.

As yet another alternative, an automated play mode of the slot machine 104 may be initiated in response to a signal from the controller 102. For example, the player may insert his or her player tracking card into the slot machine 104, which reads the player's player identifier from the player tracking card. The slot machine 104 transmits the player identifier to the controller 102, which then accesses a record corresponding to the player in a player database. The accessed record may indicate the player's preference for automated play mode, upon which the controller 102 transmits a signal to the slot machine 104 to cause the slot machine 104 to initiate the automated play mode.

Following step 1004 is step 1006. At step 1006, a game play cycle is performed. The game play cycle may be performed in accordance with conventional practices. Alternatively, in the case of a gaming device such as a video poker machine or a video blackjack machine, the game play cycle may be performed without player input, as described above, in that decisions concerning which cards to discard or when to request an additional card are made by the gaming device on the basis of one or more decision rules.

Following step 1006 is step 1008. At step 1008, it is determined whether an exit event has occurred. Step 1008 may be like step 914 described in connection with FIG. 9.

A decision block 1110 follows step 1008. Decision block 1110 may correspond to the decision block 916 discussed above in connection with FIG. 9. In particular, decision block 1110 represents a branch in the process 1000 depending upon whether an exit event was determined to have occurred. If an exit event was not determined to have occurred, the process loops back from decision block 1110 to step 1006.

If it was not determined that an exit event had occurred, then step 1112 follows decision block 1110. At step 1112 the slot machine 104 exits from the automated play mode and a suitable message is displayed to the player. (Alternatively, or additionally, the message may be presented to the player in audible form.) For example, if the automated play mode had been initiated by the player pressing the "10 play" button 314, as shown in FIG. 3, the message displayed to the player might be: "10 automatic plays complete. To resume auto-play, press '10 play' or '50 play'."

As another example, it is assumed that the exit event was depletion of the credit balance in the slot machine 104. In this case, the message displayed at step 1012 might be: "Credit balance=0. To resume auto-play deposit more money."

As another example, it is assumed that the exit event was a payout. In this case, the message displayed might be: "You have just won a jackpot of $20. Auto-play is paused. To resume auto-play, press 'auto-play' button".

Following step 1012 is step 1014. At step 1014 the slot machine 104 receives an indication from the player. For example, the player may press a button 314 or 316 as shown in FIG. 3, or the player may press a "cash-out" button or an "auto-play" button. As another example, the player may deposit money in the slot machine 104.

Following step 1014 is a decision block 1016. It is determined at decision block 1016 whether the player desires that the automated play mode be resumed. For example, if the indication received at step 1014 was actuation of one of the buttons 314, 316 of FIG. 3 or an "auto-play" button, then it may be determined that the player wishes to resume the automated play mode. Similarly, if the indication received at step 1014 was a monetary deposit, it also may be determined that the player wishes to resume the automated play mode. In any event, if a positive determination is made at decision block 1016, the process 1000 loops back to step 1004, so that the automated play mode is resumed. However, if a negative determination is made at decision block 1016, as may occur if the indication received from the play was actuation of a "cash-out" button, then the process 1000 ends, as indicated at 1018.

Figure 11:
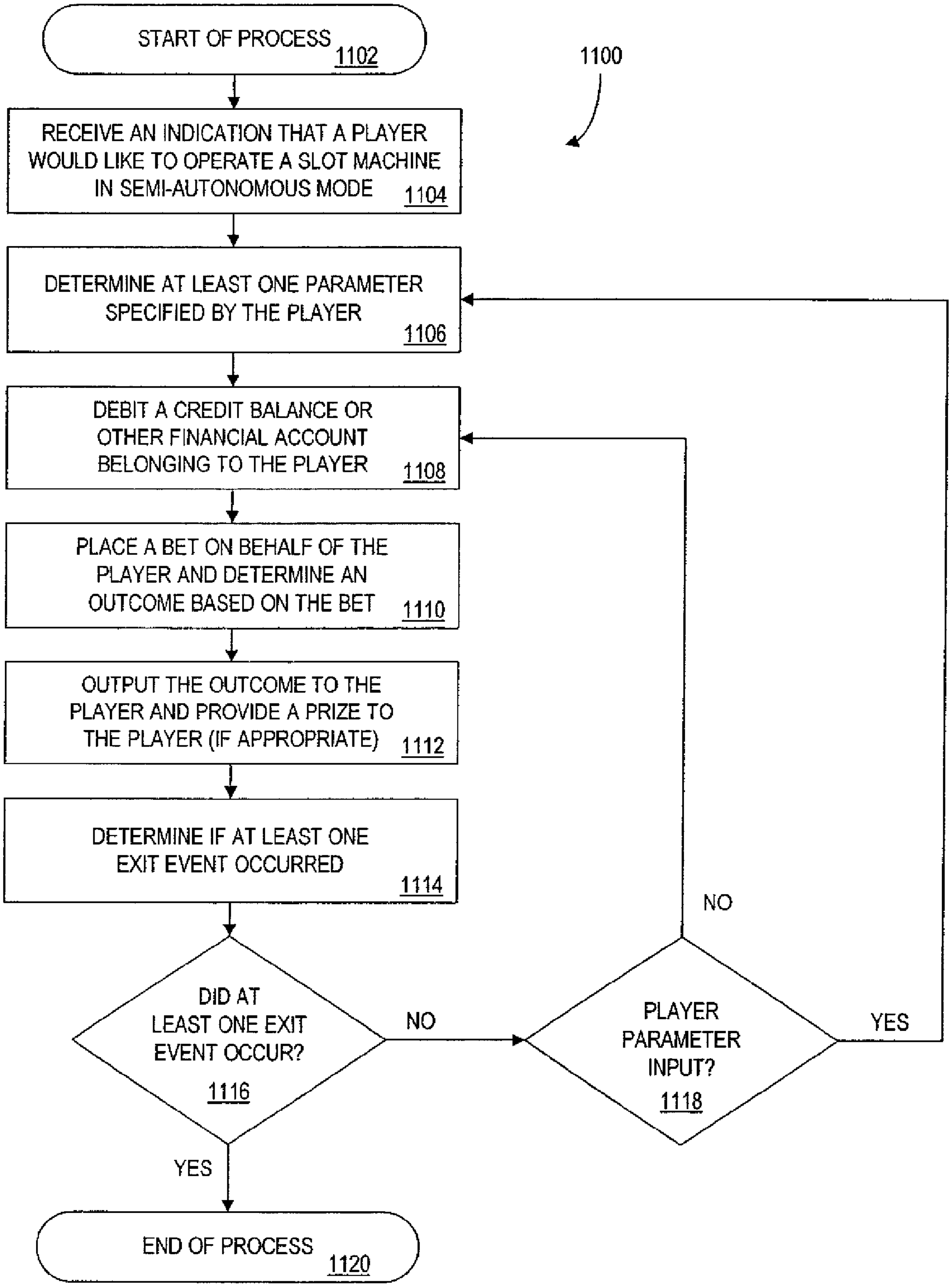

A process 1100, which is another exemplary embodiment of the invention, is illustrated in FIG. 11.

The process 1100 starts at 1102 and proceeds to step 1104. At step 1104, the slot machine receives an indication that a player wishes to operate the slot machine 104 in a semi-autonomous mode. A semi-autonomous mode may be an automated play mode during which input is received from a player. The indication that may be received at step 1104 may be the player actuating an "auto-play" button, for example.

Following step 1104 is step 1106. At step 1106 the slot machine 104 and/or the controller 102 determines at least one parameter for the automated play mode as specified by the player. For example, the slot machine 104 may prompt the player to specify an amount to be wagered in each game play cycle of the automated play mode. Additionally, or alternatively, the slot machine 104 may prompt the player to specify a parameter relating to a rate at which the automated play mode is to be performed. As still another alternative, the controller 102 may determine at least one parameter for the automated play mode based on information that had been specified by the player and stored in a player profile and/or in a player database.

It should also be understood that one or more parameters specified by the player and determined at step 1106 may relate to a limiting criterion of play and/or an exit event that is applicable to the automated play mode of the slot machine 104.

Following step 1106 is step 1108. At step 1108 the slot machine 104 and/or the controller 102 debits a credit balance or other financial account belonging to the player to cover a wager for the current game play cycle. The credit balance may be maintained in the slot machine 104 or in the controller 102. The other financial account, if pertinent, may be an account maintained by the player with the casino or may be a conventional credit card account or debit card account.

Following step 1108 is step 1110. At step 1110 a wager is put at risk, and an outcome of the current game play cycle is determined. The outcome may be determined in accordance with conventional practices or may include automatic decisions by the slot machine 104 and/or the controller 102 in regard to options like discarding cards in a video poker game or requesting an additional card in a video blackjack game which are conventionally subject to player selection.

Following step 1110 is step 1112. At step 1112 the outcome of the game play cycle is presented to the player and, if appropriate, a payout or other prize is awarded to the player. Step 1112 may be performed in accordance with conventional practices. It should be understood that in this and other embodiments, prizes and/or unused credits may be provided to the player either in standard currencies or in "alternate currencies" such as cashless gaming receipts, credits to financial accounts such as credit or debit card accounts, vouchers, coupons, tokens, frequent flyer miles and/or comp points.

Following step 1112 are step 1114 and decision block 1116. Step 1114 and decision block 1116 are concerned with determining whether an exit event occurred, and may be like step 914 and decision block 916 discussed above in connection with FIG. 9. If a negative determination is made at decision block 1116 (i.e., it is determined that no exit event has occurred), then a decision block 1118 follows decision block 1116. At decision block 1118, it is determined whether the player has provided input to the slot machine 104 to change a parameter for the automated play mode. For example, the player may have pressed a button or actuated a region of a touch screen to indicate a change in the amount of the wager to be made at each game play cycle. Alternatively, or in addition, the player may have provided input to change a rate at which the automated play mode is performed. For example, the player may have pressed a "speed up" or "slow down" button.

In one embodiment of the invention, a normal or standard rate of the automated play mode may provide for a delay of five seconds between the end of one game play cycle and the beginning of the next game play cycle. Pressing a "speed up" button when the standard rate is in effect may reduce the delay to three seconds. Pressing a "slow down" button when the standard rate is in effect may increase the delay to seven seconds. Many variations of the above described rates and/or changes in rates are contemplated, as will be appreciated by those who are skilled in the art.

If a positive determination is made at decision block 1118, i.e., if player input has been received with respect to a parameter, then the process 1100 loops back to 1106, and the parameter for which the player has indicated a change is determined in accordance with the player's input. That is, the parameter may be changed in accordance with the player's input. Then another game play cycle begins with steps 1108 etc., so that the automated play mode continues to be performed, but in accordance with the changed parameter. The continuing of the automated play mode in accordance with the changed parameter may or may not occur after a delay or pause. That is, there need not be a delay or pause.

However, if a negative determination is made at decision block 1118 (i.e., no player parameter input was received), then another game play cycle follows (steps 1108 etc.) in accordance with the same parameters as the previous game play cycle.

Considering again decision block 1116, if a positive determination is made at that decision block (i.e., an exit event did occur), then the process 1100 ends, as indicated at 1120.

The processes described herein, and variations thereof that will be apparent from the disclosure herein, may be performed as a result of operation of the processor 200 of the slot machine 104 and/or as a result of operation of the processor 400 of the controller 102 and/or as a result of combined and/or cooperative operation of both processors 200 and 400.

Except where impractical, it is contemplated that the processes and/or methods described herein and/or illustrated in FIGS. 8-11 may be performed by a single slot machine operating in accordance with the invention and without interaction with a controller. It is accordingly contemplated that the method or methods of the present invention may be performed on a stand-alone slot machine. It is further contemplated that the controller of FIG. 1 may be dispensed with or used only for conventional functions such as tracking how much money or credit is inserted into and paid out from one or more of the slot machines and/or for tracking player activity and/or in connection with progressive Jackpots. If the controller is used only or largely for accounting functions, the databases illustrated in FIGS. 4-7 may not be needed.

As an inducement for a player to operate a slot machine 104 in an automated play mode, the novel system 100 may be arranged to provide a communications function at the slot machine 104 to entertain the player and/or to occupy the players time and attention during the automated play mode. For example, the novel system 100 may be arranged so that a motion picture (e.g., a hit Hollywood film) is presented on a display of the slot machine 104. One or more speakers and/or a headset (which are not shown) may also be included in the slot machine 104 to provide the audio portion of the motion picture to the player. The display of the slot machine 104 may operate in a picture-in-picture or split-screen manner, to simultaneously present the motion picture and information regarding game play (e.g., simulated spinning reels, final reel position, messages) to the player.

In addition, or alternatively, audio entertainment such as a digital radio channel or a popular music CD may be played for the player at the slot machine 104.

As another alternative, the slot machine 104 may include a telephone handset (indicated in phantom at 322 in FIG. 3) and the novel system 100 may be arranged to provide free telephone service (including free long distance telephone service) to the player via the telephone handset 322 during an automated play mode of the slot machine 104. Dialing of the player's desired destination telephone number may be via a touch screen or keypad (not shown) on the slot machine 104 or via speech recognition from the player's oral input into the handset 322.

Other inducements may be provided to a player for operating a slot machine 104 in an automated play mode. For example, free food or drinks or additional comp points may be provided to a player who operates a slot machine in an automated play mode or for trying the automated play mode for the first time. One or more free credits in the slot machine 104 may be provided for operating the slot machine 104 in an automated play mode. Operation of the slot machine 104 in an automated play mode may also activate special features of the slot machine 104, such as one or more bonus rounds to be provided based on one or more game play cycle outcomes, or such as improved odds or an improved payout schedule.

The novel system 100 may also be arranged to allow a player to engage in earning activity at a slot machine 104 during an automated play mode of the slot machine. The player may receive increases in the credit balance at the slot machine 104 in return for the earning activity. The earning activity may include answering survey questions at the slot machine 104 (where the survey questions may be presented via a touch screen), viewing advertisements presented at the slot machine 104 (the advertisements may require responses from the player to confirm that the player is paying attention to the advertisements), or shopping via the slot machine 104. For any one or more of these earning activities, a slot machine 104 may be operated as a terminal to support the earning activity.

It should be understood that "increasing a credit balance" of a slot machine may include not reducing the credit balance when a wager is made in a current game play cycle in an automated play mode while the player is engaging in an earning activity.

According to another aspect of the invention, a single one of the slot machines 104 may be used to simultaneously conduct two or more gaming sessions. This may be accomplished, for example, by operating a display of the slot machine 104 in a split screen mode, such that one portion of the display presents information concerning one gaming session, and another part of the display presents information concerning another gaming session. Wagers for all of the two or more gaming sessions may be debited from a single credit balance maintained in the slot machine 104. One or more of the gaming sessions may be operated in an automated play mode. Automated play modes may be performed concurrently in two or more of the gaming sessions. The display operated in the split-screen mode may be a touch screen, and may include a first set of input regions in a first portion of the touch screen for the player to provide input with respect a first one of the gaming sessions, and may include a second set of input regions in a second portion of the touch screen for the player to provide input with respect to a second one of the gaming sessions.

An event in one of the concurrent sessions may be an exit event for one or both of concurrent automated play modes.

According to another aspect of the invention, one or more of the slot machines 104 may be arranged to store information, possibly including visual information regarding game play cycles performed during an automated play mode and/or during a gaming session. The slot machine 104 may provide a review mode to the player, whereby the player may cause the slot machine to replay simulated reel spins and outcomes, or the like (e.g., play of card indicia for video poker machines), for one or more game play cycles performed during the automated play mode and/or the gaming session. The review mode may include functions such as "rewind", "play", "fast forward", "pause", etc.

In addition or alternatively, a slot machine 104 may permit reviewing of game play cycles performed in an automated play mode by printing out a list of outcomes and/or other information about the game play cycles.

As indicated above, a player may operate two or more different slot machines simultaneously, with all of the two or more slot machines in automated play mode. To do so, for example, the player may insert his or her player tracking card in a first slot machine 104, deposit funds, and select the automated play mode, which then proceeds. The player then removes his or her player tracking card from the first slot machine 104 and, with automated play mode continuing in the first slot machine 104, the player inserts his or her player tracking card in a second slot machine 104. The player deposits funds in the second slot machine 104, and selects the automated play mode, which then proceeds. Based on signals received from both of the slot machines 104, the controller 102 may associate the player with both of the slot machines 104. An event at one of the slot machines 104 may be an exit event for both slot machines 104. Notification of a large payout (or any payout) on one of the slot machines 104 may be simultaneously presented on both of the slot machines 104. One or both of the slot machines 104 may operate such that a cash-out function can be actuated only at times when the player's player tracking card is interfaced to the gaming device for which cash-out is desired.

In one or more embodiments of the invention, an automated play mode may continue even after depletion of a credit balance in the slot machine 104. For example, a player may be permitted to "buy" a certain period of automated play for a certain amount of money. E.g., a player may deposit $100 in a slot machine 104 to obtain a half-hour of automated play mode. Even if the credit balance in the slot machine is decreased to zero or below zero during the half-hour period, automated play mode continues until the guaranteed time period ends. At the end of the time period, any positive credit balance may be cashed-out by the player. A negative credit balance may be charged to the player or alternatively may be forgiven.

As another possible feature, if the credit balance falls below a predetermined level during the guaranteed time period, the controller 102 (or the slot machine 104 acting on its own) may slow down the rate of automated play and/or may decrease the amount wagered per game cycle to increase the likelihood, or to ensure, that the credit balance is not decreased to zero before the end of the guaranteed period.

The foregoing description discloses only exemplary embodiments of the invention; modifications of the above disclosed apparatus and methods which fall within the scope of the invention will be readily apparent to those of ordinary skill in the art. For example, it should be understood that aspects of the invention may be utilized in connection with a device or devices located at a table game which facilitate placement of bets or other activities at a table game while reducing or eliminating actions required on a part of a player of the table game.

It should also be understood that aspects of the present invention may be applicable to games in which the skill of the player and/or player input may partially or completely determine the outcomes. Such games may include video poker and video blackjack and may also include other games not usually present in casinos. For example, such games may include a simulation of a golf putting game, in which player input causes a simulated golf ball to be propelled toward a simulated golf hole. If the simulated ball lands in the simulated hole, a prize may be awarded. A machine which allows playing of such a simulated golf game is to be included in the term "gaming device" as used herein.

Accordingly, while the present invention has been disclosed in connection with exemplary embodiments thereof, it should be understood that other embodiments may fall within the spirit and scope of the invention as defined by the following claims.

What is claimed is:

1. A method of operating a gaming system, said method comprising:

receiving a player parameter selection at a slot machine from a player at the slot machine; and initiating an automated play mode of said slot machine for the player based on said player parameter selection while the player is at the slot machine, the automated play mode being a mode of operation of the slot machine in which a new reel spin is commenced after termination of a prior reel spin without receiving any input from the player that requests the new reel spin at the slot machine, said new reel spin being independent of said prior reel spin, each reel spin of the automated play mode being associated with a distinct wager associated with said slot machine: (i) randomly generating a plurality of symbols, (ii) displaying the randomly generated symbols and (iii) providing any award associated with the randomly generated symbols, wherein when the automated play mode is initiated, the automated play mode is associated with a then unknown quantity of reel spins.

2. The method of claim 1, wherein initiating comprises:

initiating, in response to an occurrence of a game play cycle outcome, automated play of the slot machine.

3. The method of claim 1, wherein payment is not required for a game play cycle that occurs during the automated play, the method thereby comprising conducting game play cycles during the automated play mode without deducting wagers from a credit meter balance of the slot machine.

4. The method of claim 1, further comprising:

automatically terminating the automated play of said slot machine for the player in response to the first winning outcome occurring during automated play.

5. The method of claim 1, further comprising:

determining that an outcome of a game play cycle of the automated play is a winning outcome for the player; and in response to determining that the outcome of the game play cycle of the automated play is a winning outcome for the player, automatically terminating automated play of said slot machine for the player.

6. The method of claim 1, further comprising:

determining that an outcome of a game play cycle of the automated play is a winning outcome for the player; and in response to determining that the outcome of the game play cycle of the automated play is a winning outcome for the player, automatically interrupting automated play of said slot machine for the player.

7. The method of claim 6, further comprising:

after interrupting automated play, automatically resuming automated play of said slot machine for the player.

8. A method of operating a gaming system, said method comprising:

receiving a player parameter selection at a slot machine from a player at the slot machine; and terminating an automated play mode of said slot machine for the player based on said player parameter selection while the player is at the slot machine, the automated play mode being a mode of operation of the slot machine in which a new reel spin is commenced after termination of a prior reel spin without receiving any input from the player that requests the new reel spin at the slot machine, said new reel spin being independent of said prior reel spin, each reel spin of the automated play mode being associated with a distinct wager associated with said slot machine: (i) randomly generating a plurality of symbols, (ii) displaying the randomly generated symbols and (iii) providing any award associated with the randomly generated symbols, wherein when the automated play mode is initiated, the automated play mode is associated with a then unknown quantity of reel spins.

9. The method of claim 8, wherein the player parameter selection is a limiting criterion of play.

10. The method of claim 9, wherein the limiting criterion is a specified duration of an automated play session.

11. The method of claim 9, wherein the limiting criterion is a specified ending time for an automated play session.

12. The method of claim 9, wherein the limiting criterion is a specified amount won during an automated play session.

13. The method of claim 8, wherein terminating comprises:

terminating, in response to an occurrence of a game play cycle outcome, automated play of the slot machine.

14. The method of claim 8, wherein payment is not required for a game play cycle that occurs during the automated play, the method thereby comprising conducting game play cycles during the automated play mode without deducting wagers from a credit meter balance of the slot machine.

15. A method of operating a gaming system, said method comprising:

receiving a first signal that indicates selection of an automated play mode of a slot machine;

in response to receiving the first signal, prompting a player of the slot machine to confirm selection of the automated play mode;

receiving a second signal that indicates confirmation of the selection of the automated play mode; and initiating the automated play mode in response to receiving the second signal, the automated play mode being a mode of operation of the slot machine in which a new reel spin is commenced after termination of a prior reel spin without receiving any input from the player that requests the new reel spin at the slot machine, said new reel spin being independent of said prior reel spin, each reel spin of the automated play mode being associated with a distinct wager associated with said slot machine: (i) randomly generating a plurality of symbols, (ii) displaying the randomly generated symbols and (iii) providing any award associated with the randomly generated symbols. wherein when the automated play mode is initiated, the automated play mode is associated with a then unknown guantity of reel spins.

16. The method of claim 15, wherein the prompting step includes displaying a message on a touch screen.

17. The method of claim 16, wherein at least one of the first and second signals is generated by actuating a region of the touch screen.

18. The method of claim 15, wherein initiating comprises:

initiating, in response to an occurrence of a game play cycle outcome, automated play of the slot machine.

19. The method of claim 15, wherein payment is not required for a game play cycle that occurs during the automated play, the method thereby comprising conducting game play cycles during the automated play mode without deducting wagers from a credit meter balance of the slot machine.

20. A method of operating a gaming system, said method comprising:

initiating an automated play mode of a slot machine, the automated play mode being executed in accordance with a parameter;

receiving a signal from a player at the slot machine during the automated play mode;

changing the parameter in response to the received signal; and continuing executing the automated play mode in accordance with the changed parameter, the automated play mode being a mode of operation of the slot machine in which a new reel spin is commenced after termination of a prior reel spin without receiving any input from the player that requests the new reel spin at the slot machine, said new reel spin being independent of said prior reel spin, each reel spin of the automated play mode being associated with a distinct wager associated with said slot machine: (i) randomly generating a plurality of symbols, (ii) displaying the randomly generated symbols and (iii) providing any award associated with the randomly generated symbols, wherein when the automated play mode is initiated, the automated play mode is associated with a then unknown guantity of reel spins.

21. The method of claim 20, wherein a rate of executing each reel spin of the automated play mode is controlled in accordance with the parameter.

22. The method of claim 20, wherein the parameter indicates an amount wagered in each game play cycle.

23. The method of claim 20, wherein initiating comprises:

initiating, in response to an occurrence of a game play cycle outcome, automated play of the slot machine.

24. The method of claim 20, wherein payment is not required for a game play cycle that occurs during the automated play, the method thereby comprising conducting game play cycles during the automated play mode without deducting wagers from a credit meter balance of the slot machine.

25. A method of operating a gaming system, said method comprising:

executing an automated play mode of a slot machine in association with at a first rate of providing a plurality of reel spins of the slot machine;

receiving a signal during the automated play mode; and in response to the received signal, executing the automated play mode in accordance with a second rate of providing a plurality of reel spins of the slot machine that is different from the first rate, the automated play mode being a mode of operation of the slot machine in which a new reel spin is commenced after termination of a prior reel spin without receiving any input from the player that requests the new reel spin at the slot machine, said new reel spin being independent of said prior reel spin, each reel spin of the automated play mode being associated with a distinct wager associated with said slot machine: (i) randomly generating a plurality of symbols, (ii) displaying the randomly generated symbols and (iii) providing any award associated with the randomly generated symbols, wherein when the automated play mode is initiated, the automated play mode is associated with a then unknown guantity of reel spins.

26. The method of claim 25, wherein:

executing the automated play mode at the first rate includes providing a first delay between consecutive game play cycles; and executing the automated play mode in accordance with the second rate includes providing a second delay between consecutive game play cycles, the second delay being different from the first delay.

27. The method of claim 25, further comprising:

initiating, in response to an occurrence of a game play cycle outcome, automated play of the slot machine.

28. The method of claim 25, wherein payment is not required for a game play cycle that occurs during the automated play, the method thereby comprising conducting game play cycles during the automated play mode without deducting wagers from a credit meter balance of the slot machine.

29. The method of claim 25, wherein the rate comprises a number of game play cycles executed per unit of time.

30. The method of claim 25, wherein receiving the signal comprises receiving an indication of an instruction by the player to increase the rate of play during the automated play mode.

31. The method of claim 25, wherein receiving the signal comprises receiving an indication of an instruction by the player to decrease the rate of play during the automated play mode.

32. The method of claim 25, further comprising:

determining that a credit balance for the slot machine is less than a predetermined level during the automated play mode; and wherein receiving the signal comprises receiving from a controller an instruction to decrease the rate of play in response to determining the credit balance is less than the predetermined level during the automated play mode.

33. The method of claim 25, further comprising:

determining a winning outcome during the automated play mode; and interrupting play of the automated play mode in response to determining the winning outcome.

34. The method of claim 25, further comprising:

determining a winning outcome during the automated play mode; and terminating play of the automated play mode in response to determining the winning outcome.

35. A method of operating a gaming system, said method comprising:

executing an automated play mode of a slot machine such that a first amount is wagered per game play cycle for a plurality of game play cycles;

receiving a signal from a player during the automated play mode; and in response to the received signal, executing the automated play mode such that a second amount is wagered per game play cycle, the second amount being different from the first amount, the automated play mode being a mode of operation of the slot machine in which a new reel spin is commenced after termination of a prior reel spin without receiving input from the player that requests the new reel spin at the slot machine, said new reel spin being independent of said prior reel spin, each reel spin of the automated play mode being associated with a distinct wager associated with said slot machine: (i) randomly generating a plurality of symbols, (ii) displaying the randomly generated symbols and (iii) providing any award associated with the randomly generated symbols, wherein when the automated play mode is initiated, the automated play mode is associated with a then unknown guantity of reel spins.

36. The method of claim 35, further comprising:

initiating, in response to an occurrence of a game play cycle outcome, automated play of the slot machine.

37. The method of claim 35, wherein payment is not required for a game play cycle that occurs during the automated play, the method thereby comprising conducting game play cycles during the automated play mode without deducting wagers from a credit meter balance of the slot machine.

38. A method of operating a gaming system, said method comprising:

receiving an input of an automated play parameter from a player at a gaming device;

initiating an automated play mode of said gaming device, said automated play mode including a plurality of plays of a primary wagering game, wherein each new play of the primary wagering game is commenced after a termination of a prior play of the primary wagering game without receiving any input from the player that requests the new play of the primary wagering game, said new play of the primary wagering game being independent of said prior play of the primary wagering game, said new play of the primary wagering game and said prior play of the primary wagering game each being associated with a distinct wager and said new play of the primary wagering game and said prior play of the primary wagering game each being associated with a randomly generated outcome; and terminating the automated play mode of said gaming machine if a winning outcome is randomly generated in any of the plays of the primary wagering game.

* * * * *

UNITED STATES PATENT AND TRADEMARK OFFICE
CERTIFICATE OF CORRECTION

PATENT NO. : 7,722,460 B2
APPLICATION NO. : 11/428601
DATED : May 25, 2010
INVENTOR(S) : Walker et al.

It is certified that error appears in the above-identified patent and that said Letters Patent is hereby corrected as shown below:

IN THE CLAIMS:

In Claim 4, Column 36, lines 29 and 30, replace “the first winning outcome” with --a first winning outcome--.

In Claim 25, Column 38, line 34, delete “at”.

In Claim 29, Column 39, line 6, replace “the rate” with --the first rate and the second rate--.

In Claim 30, Column 39, line 10, replace “the rate of play” with --a rate of play--.

In Claim 31, Column 39, line 14, replace “the rate of play” with --a rate of play--.

In Claim 32, Column 39, line 21, replace “the rate of play” with --a rate of play--.

In Claim 35, Column 40, line 14, replace “guantity” with --quantity--.

Signed and Sealed this

Ninth Day of November, 2010

David J. Kappos
*Director of the United States Patent and Trademark Office*